(12) United States Patent
Holt et al.

(10) Patent No.: US 9,080,377 B2
(45) Date of Patent: Jul. 14, 2015

(54) COLLAPSIBLE VANE STRUCTURE AND RELATED METHOD FOR A SHADE FOR AN ARCHITECTURAL OPENING

(71) Applicant: Hunter Douglas Inc., Pearl River, NY (US)

(72) Inventors: Ronald Holt, Westminster, CO (US); Marcus Long, Erie, CO (US); Kelly Q. Rahn, Dacono, CO (US); Jason T. Throne, Rockport, ME (US); Stephen T. Wisecup, Niwot, CO (US)

(73) Assignee: Hunter Douglas Inc., Peal River, NY (US)

( * ) Notice: Subject to any disclaimer, the term of this patent is extended or adjusted under 35 U.S.C. 154(b) by 75 days.

(21) Appl. No.: 13/948,692

(22) Filed: Jul. 23, 2013

(65) Prior Publication Data
US 2013/0306218 A1 Nov. 21, 2013

Related U.S. Application Data

(62) Division of application No. 12/958,664, filed on Dec. 2, 2010, now Pat. No. 8,496,768.

(60) Provisional application No. 61/265,947, filed on Dec. 2, 2009.

(51) Int. Cl.
*E06B 9/34* (2006.01)
*E06B 9/386* (2006.01)
(Continued)

(52) U.S. Cl.
CPC ............... *E06B 9/266* (2013.01); *B29C 69/001* (2013.01); *E06B 9/264* (2013.01); *E06B 9/34* (2013.01);
(Continued)

(58) Field of Classification Search
CPC ........... E06B 9/26; E06B 9/264; E06B 9/266; E06B 9/34; E06B 9/386; E06B 9/40; E06B 9/42; B29C 69/001; B29C 2793/00; B29C 2793/0036; B29C 2793/0054; B29C 2793/0072; Y10T 29/39; Y10T 156/1052; Y10T 156/1062; Y10T 156/1064; Y10T 156/1082
USPC ......... 156/65, 256, 257, 268, 270; 160/121.1, 160/133, 138, 161; 29/24.5
See application file for complete search history.

(56) References Cited

U.S. PATENT DOCUMENTS 1,958,695 A 5/1934 Claus
2,267,869 A 12/1941 Loehr
(Continued)

FOREIGN PATENT DOCUMENTS

EP 0482794 A1 4/1992
EP 0654577 A1 5/1995
(Continued)

OTHER PUBLICATIONS

Author Unknown, "Poliformas Plasticas—Resinas Poliester—Fibra de Vidrio", www.poliformasplasticas.com/mx/2011/innova_laminas.php (2010), 4 pages.

*Primary Examiner* — Michael Tolin
(74) *Attorney, Agent, or Firm* — Dorsey & Whitney LLP

(57) ABSTRACT

A base structure and associated method for converting the base structure into an operable vane on a shade for an architectural opening. The base structure includes a back sheet and a front sheet attached together in engagement regions spaced along the length of the back sheet and front sheet. The front sheet is separated into front strip sections having a free end. Operating elements are positioned along the back sheet and situated so as to move relative thereto. The operating elements are attached adjacent to a free end of the front strip. Movement of the operating elements actuates the free end of the front strip to move from a closed position to an open position as desired by the user.

18 Claims, 26 Drawing Sheets

(51) Int. Cl.
*E06B 9/266* (2006.01)
*E06B 9/264* (2006.01)
*B29C 69/00* (2006.01)

(52) U.S. Cl.
CPC ......... *E06B 9/386* (2013.01); *B29C 2793/0054* (2013.01); *Y10T 29/39* (2015.01); *Y10T 156/1052* (2015.01); *Y10T 156/1062* (2015.01); *Y10T 156/1064* (2015.01); *Y10T 156/1082* (2015.01); *Y10T 156/12* (2015.01); *Y10T 156/13* (2015.01)

(56) References Cited

U.S. PATENT DOCUMENTS

| | | | |
|---|---|---|---|
| RE22,311 E | 5/1943 | Roy |
| 2,350,200 A | 5/1944 | Starr |
| 2,874,612 A | 2/1959 | Luboshez |
| 3,190,086 A | 6/1965 | Klein |
| 3,222,689 A | 12/1965 | Efron et al. |
| D208,350 S | 8/1967 | Cheris |
| 3,566,499 A | 3/1971 | James |
| 4,282,919 A | 8/1981 | Teno |
| 5,205,334 A | 4/1993 | Judkins |
| 5,228,936 A | 7/1993 | Goodhue |
| 5,231,708 A | 8/1993 | Hansen |
| 5,313,999 A | 5/1994 | Colson et al. |
| 5,355,555 A | 10/1994 | Zarelius |
| 5,490,553 A | 2/1996 | Colson et al. |
| 5,503,210 A | 4/1996 | Colson et al. |
| 5,547,006 A | 8/1996 | Auger |
| 5,558,925 A | 9/1996 | Fritzman |
| 5,645,504 A | 7/1997 | Westhoff |
| 5,649,583 A | 7/1997 | Hsu |
| 5,680,891 A | 10/1997 | Prince |
| 5,714,034 A | 2/1998 | Goodhue |
| 5,733,632 A | 3/1998 | Marusak |
| 5,787,951 A | 8/1998 | Tonomura et al. |
| 5,855,235 A | 1/1999 | Colson et al. |
| 5,897,731 A | 4/1999 | Colson et al. |
| 5,918,655 A | 7/1999 | Corey |
| 5,960,847 A | 10/1999 | Crider et al. |
| 6,006,812 A | 12/1999 | Corey |
| 6,112,797 A | 9/2000 | Colson et al. |
| 6,223,802 B1 | 5/2001 | Colson |
| D443,455 S | 6/2001 | Hynniman |
| 6,289,964 B1 | 9/2001 | Colson et al. |
| 6,345,486 B1 | 2/2002 | Colson et al. |
| 6,484,786 B1 | 11/2002 | Ruggles et al. |
| D468,950 S | 1/2003 | Judkins |
| 6,572,725 B2 | 6/2003 | Goodhue |
| 6,595,262 B2 | 7/2003 | Chen |
| 6,688,373 B2 | 2/2004 | Corey et al. |
| 6,740,389 B2 | 5/2004 | Yu |
| 6,792,994 B2 | 9/2004 | Lin |
| 6,932,138 B2 | 8/2005 | Yu et al. |
| 6,978,821 B2 | 12/2005 | Welfonder |
| D515,345 S | 2/2006 | Herhold |
| 7,111,659 B2 | 9/2006 | Harper et al. |
| 7,117,917 B2 | 10/2006 | Allsopp |
| 7,147,029 B2 | 12/2006 | Kovach et al. |
| 7,191,816 B2 | 3/2007 | Colson et al. |
| 7,207,370 B2 | 4/2007 | Snyder et al. |
| 7,237,591 B2 | 7/2007 | Snyder et al. |
| 7,311,131 B2 | 12/2007 | Nien et al. |
| 7,337,822 B2 | 3/2008 | Snyder et al. |
| D568,082 S | 5/2008 | Bohlen |
| 7,500,505 B2 | 3/2009 | Smith et al. |
| 7,549,455 B2 | 6/2009 | Harper et al. |
| 7,578,334 B2 | 8/2009 | Smith et al. |
| 7,588,068 B2 | 9/2009 | Colson et al. |
| D605,885 S | 12/2009 | Judkins |
| 7,637,301 B2 | 12/2009 | Forst Randle |
| 7,730,931 B2 | 6/2010 | Stern |
| D622,964 S | 9/2010 | Colson |
| D623,419 S | 9/2010 | Swiszcz et al. |
| D632,492 S | 2/2011 | Colson et al. |
| D632,493 S | 2/2011 | Colson et al. |
| D640,472 S | 6/2011 | Colson et al. |
| D640,875 S | 7/2011 | Colson et al. |
| 7,971,624 B2 | 7/2011 | Harper et al. |
| 8,151,857 B2 | 4/2012 | Colson et al. |
| 8,171,640 B2 | 5/2012 | Colson et al. |
| 8,393,080 B2 | 3/2013 | Ballard et al. |
| 8,496,768 B2 | 7/2013 | Holt et al. |
| 2005/0087309 A1 | 4/2005 | Nien et al. |
| 2006/0191646 A1 | 8/2006 | Harper et al. |
| 2007/0010147 A1 | 1/2007 | Swiszcz |
| 2007/0039699 A1* | 2/2007 | Colson et al. .............. 160/121.1 |
| 2007/0074826 A1 | 4/2007 | Jelic et al. |
| 2008/0066277 A1* | 3/2008 | Colson et al. ................. 29/24.5 |
| 2012/0193040 A1 | 8/2012 | Colson et al. |
| 2013/0139977 A1 | 6/2013 | Ballard et al. |
| 2014/0096915 A1 | 4/2014 | Colson et al. |

FOREIGN PATENT DOCUMENTS

| | | |
|---|---|---|
| EP | 1213435 A2 | 6/2002 |
| GB | 1494842 A | 12/1977 |
| JP | 06-173549 A | 6/1994 |
| JP | 07-39449 A | 2/1995 |
| JP | 09-221969 A | 8/1997 |
| TW | 549344 U | 8/2003 |
| WO | 8502760 A1 | 7/1985 |
| WO | 9429559 A1 | 12/1994 |
| WO | 2005019584 A2 | 3/2005 |
| WO | 2005062875 A2 | 7/2005 |
| WO | 2005081948 A2 | 9/2005 |
| WO | 2006023751 A2 | 3/2006 |
| WO | 2006098853 A2 | 9/2006 |

* cited by examiner

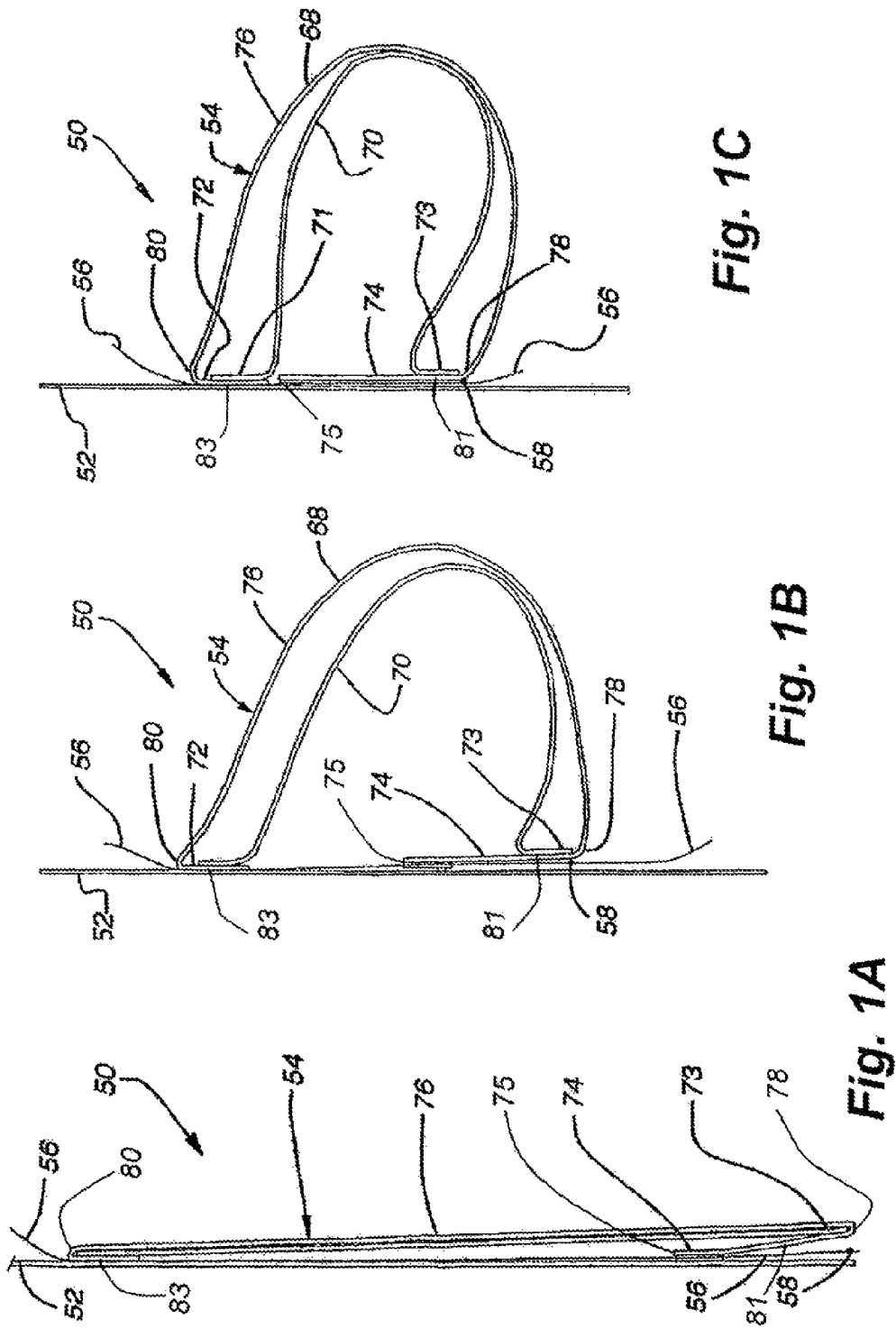

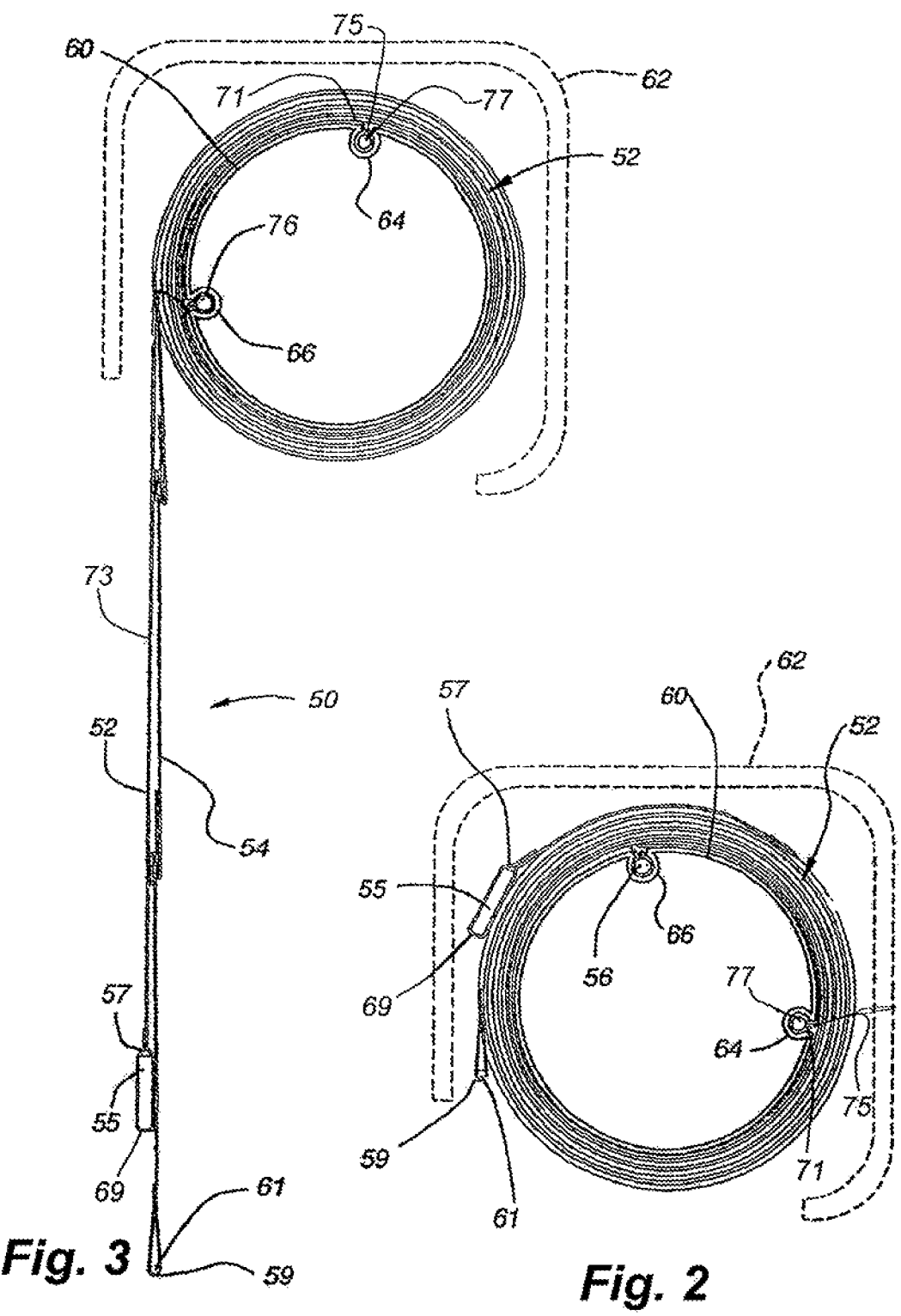

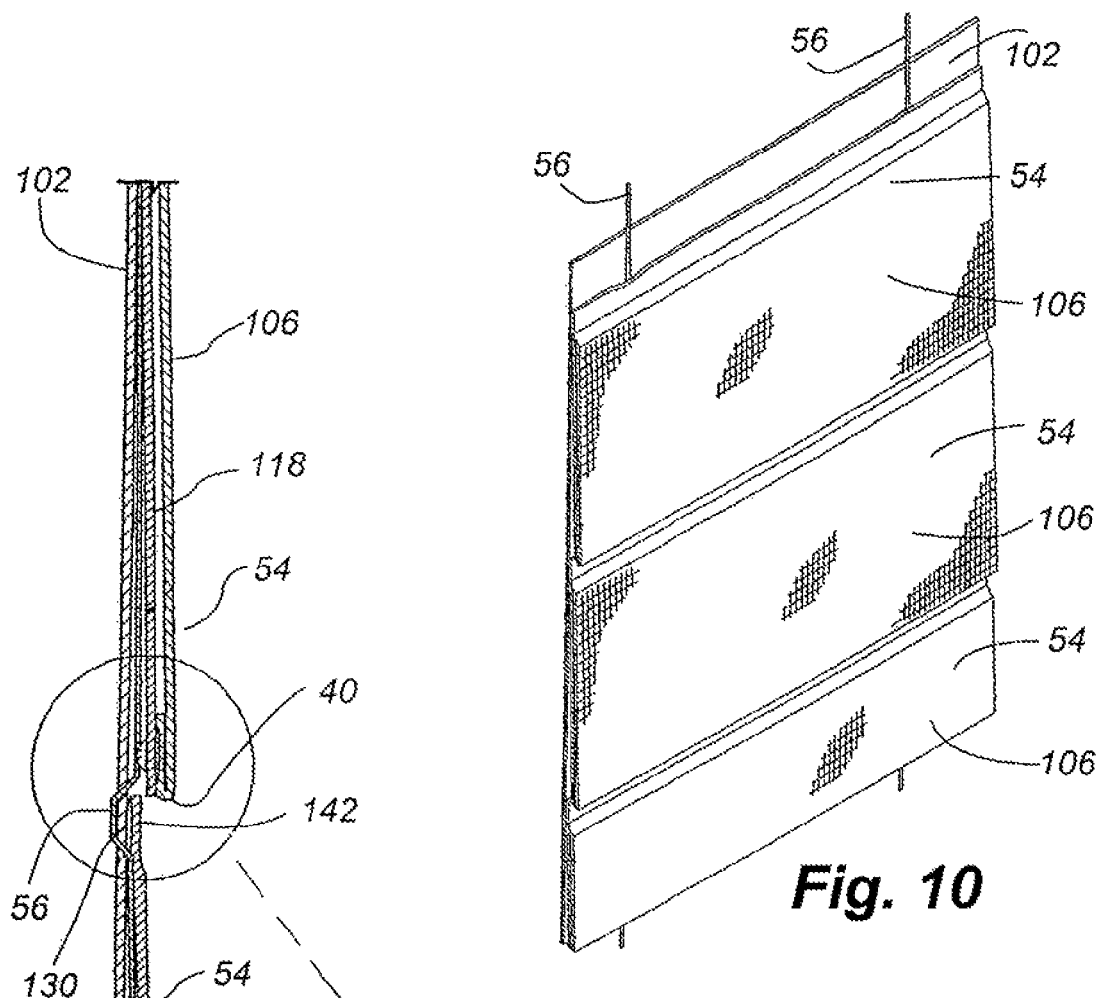
Fig. 10
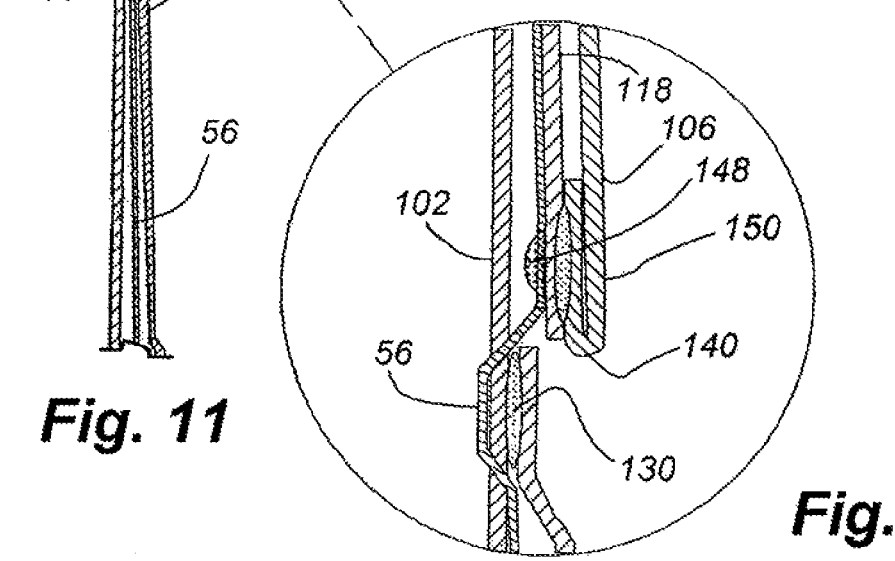
Fig. 11
Fig. 12

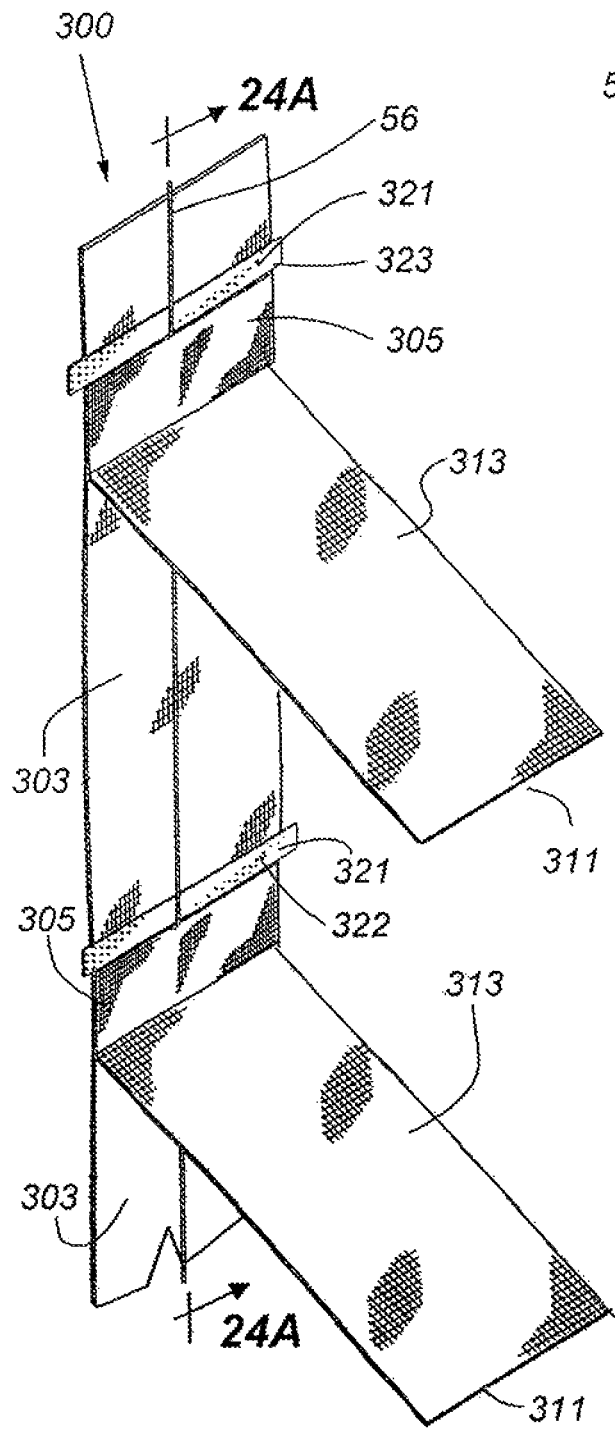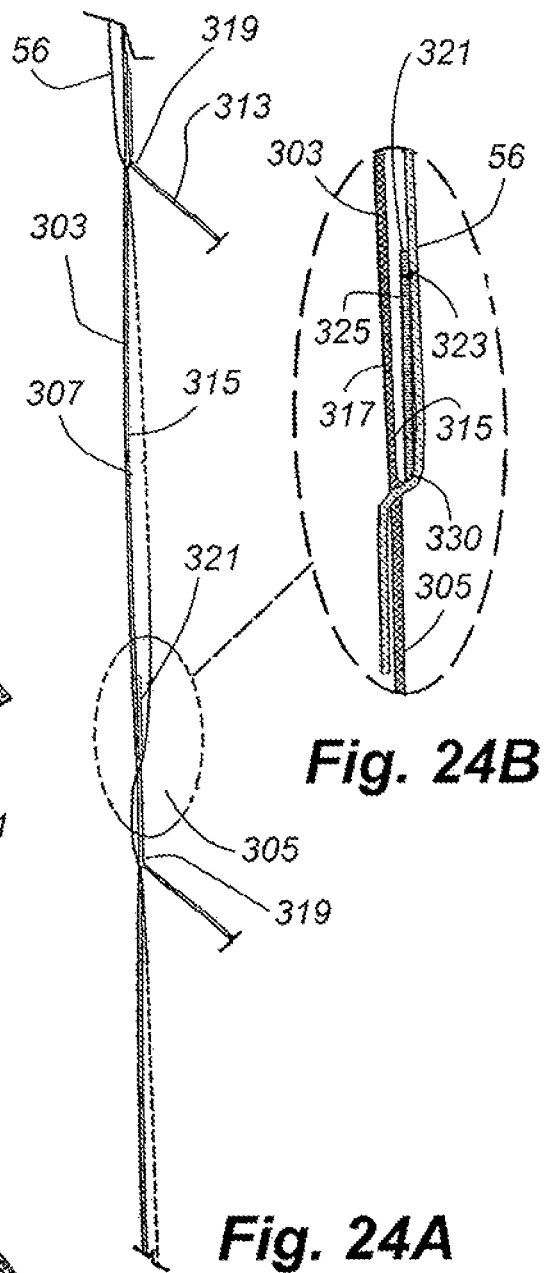
Fig. 23
Fig. 24A
Fig. 24B

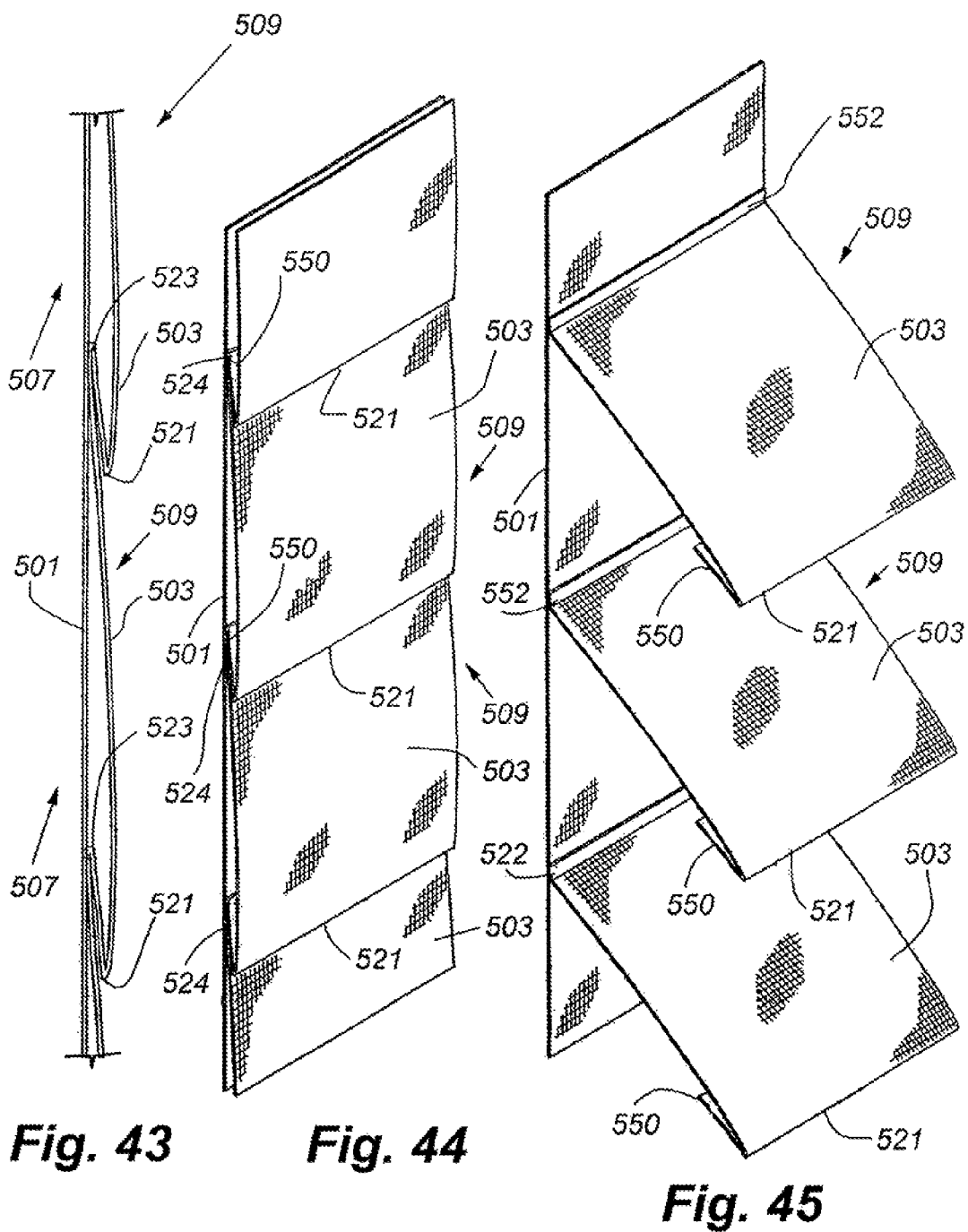

COLLAPSIBLE VANE STRUCTURE AND RELATED METHOD FOR A SHADE FOR AN ARCHITECTURAL OPENING

CROSS REFERENCE TO RELATED APPLICATIONS

The present application is a divisional application of U.S. patent application Ser. No. 12/958,664 filed on Dec. 2, 2010, now U.S. Pat. No. 8,496,768, and entitled "Collapsible Vane Structure and Related Method For a Shade For an Architectural Opening", which claims the benefit under 35 U.S.C. §119(e) to U.S. Provisional Patent Application No. 61/265,947 filed on Dec. 2, 2009 and entitled "Collapsible Vane Structure and Related Method for a Shade for an Architectural Opening", which are hereby incorporated herein by reference in their entireties.

This application is also related to International Patent Application No. PCT/US2005/029593 filed on Aug. 19, 2005 and entitled "Apparatus and Method For Making a Window Covering Having Operable Vanes" and is hereby incorporated by reference herein in its entirety.

FIELD OF THE INVENTION

The present invention relates generally to the structure and related method of making a collapsible vane for use in a covering for an architectural opening.

BACKGROUND OF THE INVENTION

Coverings for architectural openings such as windows, doors, archways and the like have assumed numerous forms for many years. Early forms of such coverings consisted primarily of fabric draped across the architectural opening, and in many instances the fabric was not movable between extended and retracted positions relative to the opening.

Retractable coverings for architectural openings, herein referred to as shades, have evolved into many different forms, which include roller shades in which a piece of flexible material can be extended from a wrapped condition on a roller to an extended position across the architectural opening, and vice versa. Other popular forms of retractable coverings for an architectural opening include Venetian blinds, vertical blinds, cellular shades and various variations on these basic designs. Cellular shades, as opposed to roller shades, generally collapse and stack up when retracted, and expand or extend when in the extended position.

Typically, shades of virtually any type may be manually retracted and extended by the user. More recently systems have been developed to allow a user to also alter the amount of light passing through a shade that is in an extended position. Typically, these types of shades have vanes that are movably positioned on the body of the shade, with the vanes controlled by the user. However, these movable vanes are difficult to assemble because of the flexibility and need to be movable between different positions.

It is to satisfy the above-recognized issues that the present invention has been developed.

BRIEF SUMMARY OF THE INVENTION

The invention described herein primarily relates to the structure of an operable vane portion of a shade, and the associated method of manufacturing such structure. In general, the conversion of a base structure to an operable vane structure includes the transition of a base structure by manual (human or simple tools) or automatic means (computer controlled processes and machines) from an initial configuration to a final configuration having an operable vane. The base structure generally includes a back sheet, and a front sheet, with the front sheet being attached directly or indirectly to the back sheet at spaced apart locations to form segments. The front sheet is then cut or sliced to form front strips having top edges still engaged with the back sheet, and bottom edges freely disassociated from the back sheet. Operating elements (at least one) are then positioned along the back sheet so as to be movable relative thereto, and so as to be movable relative to the top edge of each front strip. The operating elements are then affixed to the bottom edges (or adjacent thereto) of the front strips. The top of the back sheet and the upper ends of the operating elements are engaged with a top roller, and the bottom of the back sheet and the bottom ends of the operating elements are engaged with a common bottom rail (or separate bottom rail or weights). The front strips are then operable vanes which are controlled by the user to move between an extended or closed position to an open or retracted position relative to the back sheet. The operating elements are actuated by the roller.

Each of the examples provided herein have the common elements, or similar features, which allow the conversion of the base structure to a shade with operable vanes.

In one example, a method of making a shade for an architectural opening having at least one operable vane may include providing a base structure having a back sheet and a front sheet, the back sheet and front sheet connected by one or more intermediate strips extending between the back sheet and the front sheet periodically along a length of extension of the back and front sheets, and unconnected between the one or more intermediate strips. The method may further include cutting the front sheet to form an elongated strip having at least one of the one or more intermediate strips and a portion of the front sheet. The elongated strip may include a first edge joined to the back sheet and a second free edge. The method may also include positioning at least one operating element between the back sheet and the top edge of the elongated strip so that the at least one operating element is movable relative to the back sheet, and attaching the at least one operating element to the elongated strip to form the at least one operable vane. The at least one operable vane is configured to move relative to the back sheet upon actuation of the operating element.

In a further aspect of this first example, the at least one operating element is attached to the first edge of the elongated strip. In another aspect of this example, the top edge of the elongated strip is formed by the at least one of the one or more intermediate strips. In a further aspect of this example, the bottom edge of the elongated strip is formed by the front sheet.

In another aspect of this first example, the cutting step includes cutting the front sheet along a line adjacent to the first edge. In another aspect, the method may further include folding the elongated strip to form a third folded edge and joining the second free end to the at least one of the one or more intermediate strips. In some aspects of this example, the attaching step may include joining the third folded edge to the at least one operating element. Additionally, the attaching step may further include applying an adhesive to the third folded edge.

In another example of the invention, a method of making a shade for an architectural opening having at least one operable vane may include providing a base structure having a back sheet and a front sheet. The back sheet and front sheet may be connected by one or more engagement regions extending periodically along a length of extension of the back and front sheets, and unconnected between the one or more engagement regions. The method may further include cutting the front sheet adjacent at least one of the one or more engagement regions to form a strip comprising a first edge joined to the back sheet and a second free edge, positioning at least one operating element between the back sheet and the strip so that the at least one operating element is movable relative to the back sheet, and attaching the at least one operating element to the strip to form the at least one operable vane. The at least one operable vane is configured to move relative to the back sheet upon actuation of the operating element.

Another example of the invention, may be directed to an apparatus for performing a process for manufacturing an architectural opening from a base structure having a back sheet and a front sheet. The back sheet and front sheet may be connected by one or more engagement regions extending periodically along a length of extension of the back and front sheets, and unconnected between the one or more engagement regions. The apparatus may be configured to cut the front sheet adjacent at least one of the one or more engagement regions to form a strip including a first edge joined to the back sheet and a second free edge, position at least one operating element between the back sheet and the strip so that the at least one operating element is movable relative to the back sheet, and attach the at least one operating element to the strip to form the at least one operable vane.

Other aspects, features and details of the present invention can be more completely understood by reference to the following detailed description of the various embodiments, taken in conjunction with the appended claims and drawings.

BRIEF DESCRIPTION OF THE DRAWINGS

The features and advantages of the present invention will be more readily apparent from the following detailed description, illustrated by way of example in the drawing figures, wherein:

FIGS. 1A, 1B, and 1C show side views of an operable vane in the closed position, intermediate position, and open position, respectively.

FIG. 2 shows a side view of a shade housing enclosing a shade structure rolled around a top control roller in the retracted position.

FIG. 3 shows a side view of a shade housing enclosing a shade structure similar to FIG. 2, but with the shade structure in the extended position.

FIG. 10 shows the base structure shown in FIG. 4 having been converted to an operable vane structure.

FIG. 11 shows a side view of the operable vane structure shown in FIG. 10.

FIG. 12 shows an enlarged portion of FIG. 11 to illustrate the front strip and the adhesive attaching the front strip to the operating element.

FIG. 23 shows the base structure shown in FIG. 18, after application of adhesive to the operating elements in order to attach the operating elements to the front strips.

FIG. 24A is a cross-section view of the base structure shown in FIG. 23, as taken along line 24A-24A in FIG. 23.

FIG. 24B is an enlarged portion of the base structure shown in FIG. 24A.

FIG. 43 shows a fourth example of a base structure prior to conversion to an operable vane structure.

FIG. 44 shows a front perspective view of the base structure of FIG. 43.

FIG. 45 shows the base structure of FIG. 43 after the first conversion step has taken place, namely slicing the bottom edge of each front strip segment to separate it from the back sheet.

DETAILED DESCRIPTION OF THE INVENTION

Figure 4:
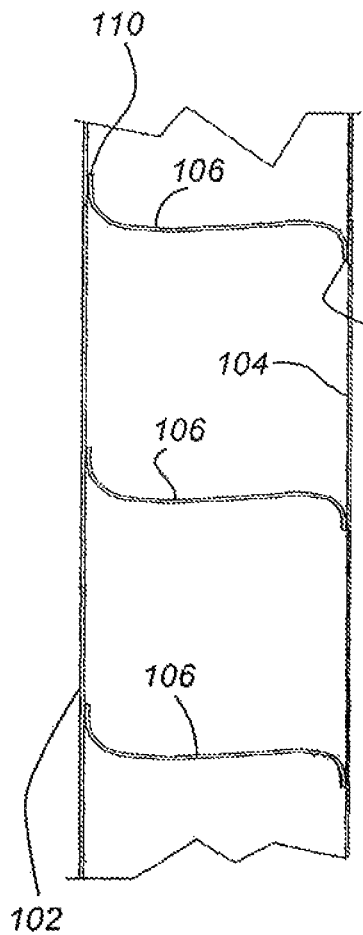
FIG. 4 shows a side view of a first example of a base structure.

The invention described herein relates to the structure and assembly of operable vanes on a covering for an architectural opening. More particularly, the invention relates to the various ways such an operable vane may be assembled in order to be sufficiently operable in general common shade structures. It is contemplated that this invention may apply to other types of coverings for architectural openings.

The invention described herein relates to the apparatus and method associated with the manufacturing of a panel for covering an architectural opening, one embodiment of the panel being a retractable shade with operable vanes. The vanes are operable by being collapsible, rotatable, collectable or having other type of individual or collective movement. To better understand the features of the apparatus and methods and particular vane structures involved in its use, FIGS. 1A, 1B and 1C address the general structure of one embodiment of a retractable shade with collapsible vanes.

The retractable vane 50 in the instant embodiment is shown in various operable positions in FIGS. 1A through 1C. The retractable shade includes a support sheer 52 (also a back sheet), a plurality of vanes 54 connected to the support sheer, and operating elements 56 for moving the vanes between the closed and open positions. The support sheer 52 in this instant embodiment is in the form of a flexible sheet of sheer fabric. The support sheer 52, or sheet, in one embodiment has a rectangular configuration having top 71 and bottom 69 edges (as shown in FIG. 3) and left 73 and right (not shown) edges with a weighted bottom rail 61 being secured to the bottom edge 59 of the support sheer 52. As shown in FIGS. 1A through 10, the retractable shade 50 with collapsible vanes 54 can be moved from a first or closed position as shown in FIG. 1A to a collapsed or open position as shown in FIG. 1C. FIG. 1B shows an intermediate position in a transition from the first position to the final position. FIG. 1C shows the vane 54 in a fully collapsed position. The nodules 58 on the operating elements 56 are included here to show the movement of the operating elements relative to the support sheer 52.

In one embodiment, as shown in FIGS. 2 and 3, the support sheer 52 is suspended along its top edge 71 from a generally cylindrical roller 60 disposed in the head rail 62 for the shade 50, with the roller 60 being mounted for selective reversible rotative movement about a horizontal central axis in a conventional manner. As can be seen, the roller 60 is provided with a first and second circumferentially spaced axially extending grooves 64, 66 which open through the periphery of the roller 60, with the first groove 64 supporting the top edge 71 of the support sheer 52. The top edge 71 of the support sheer 52 may be hemmed so a rod 77 can be inserted through the hem and longitudinally positioned in the groove 64 where it is retained by a pair of lips 75 defined in the periphery of the roller 60 where the groove 64 opens through the periphery. The lips 75 are spaced at a smaller distance apart than the diameter of the rod 77 so that the rod 77 and the hemmed top edge 71 of the support sheer 52 are confined within the groove 64. Alternatively, a poly strip or other such structure may be used to wedge the top edge 71 of the fabric into the groove 64, without the need for a hemmed structure as described herein.

The bottom edge 69 of the support sheer 52 may be weighted, such as with a rod 55, received within a hemmed pocket 57, such as that shown in FIG. 3. The weight may also be provided by a structural bottom rail attached to the bottom of the support sheer 52 as discussed later herein. The weight may not be at the bottom edge 69 of the support sheer 52 but may instead be generally in the middle of the length of the support sheer or on a lower portion of the support sheer 52. FIG. 3 also shows the bottom edge 59 of the bottom-most vane 54 which may include a weight attached thereto such as a rod 61 positioned in a hemmed section or other type of weight to pull the operating elements downwardly and cause the lower edge of the vane to lower more readily. Since the operating elements are attached to the bottom portion of the vane 54, as described later herein, if the bottom portion of the bottom-most vane is weighted, the weight will assist in pulling the operating elements 56 downwardly when desired by the user. This overall structure allows the shade 50 to be retracted around and unwound from the roller 60 as the roller 60 is rotated.

The retractable shade 50 disclosed herein also includes a plurality of flexible vertically extending operating elements 56 which are horizontally spaced across the width of the panel. The upper end of the operating elements 56 are secured to the roller 60 in a second groove 66 (See FIGS. 2 and 3). This attachment to the second groove 66 is made by tying the upper ends of each operating element 56 to a rod 76 that is inserted in the second groove 66 and retained therein as described with respect to the first groove 64. The operating elements 56 act on the vanes 54 as is described in more detail below.

The structure from which the shade 50 is suspended, retracted and activated from may take on forms other than the cylinder or roller 60 and the head rail 62 described above. Also the shade 50 may be wrapped around the cylinder 60 in a different direction so as to hang from the other side of the roller 60 as desired. Further, the attachment mechanism for attaching the backing sheet 52 to the roller 60 as well as the operating elements to the roller 60 may take a variety of different forms.

The plurality of elongated vanes 54 are suspended generally horizontally across the front face of the support sheer 52 at vertically spaced locations. Each vane 54 has a generally rectangular configuration although other configurations are contemplated, and is made with a flexible material and has a front portion 68 and a rear portion 70 as is best shown in FIGS. 1B and 1C. The rear portion 70 is optional and may be made of a variety of material or fabric and may be light transmitting or light blocking. The front portion 68 and rear portion 70 of each vane 54 are attached together to form a unitary structure. The top edge 80 of the front portion 68 is typically folded rearwardly and downwardly to form a top tab 72 and the bottom edge 78 of the front portion 68 is folded rearwardly and upwardly to form a bottom tab 74. The top edge 71 of the rear portion 70 is attached to the inside edge of the upper tab 72 and the bottom edge 73 of the rear portion 70 is attached to the inside edge of the lower tab 74 as is best shown in FIGS. 1B and 1C.

As shown in FIGS. 1A and 1B, the bottom edge 73 of the rear portion 70 is attached a short distance away from the terminal edge 75 of the bottom tab 74. This relative location is variable based on the desired actuation and aesthetics of the vane 54 as it moves from the closed to open positions, and can be changed as desired for any desired configuration. The front 68 and rear 70 portions combine to form the vane structure 54. While described above as being rectangular, the vanes 54 may be of any desired shape and able to have the functionality described herein. The vane structure 54 is effectively a tube with bending properties to achieve the desired aesthetic effect when in closed and open positions. Each vane structure 54 defines a top 80 and bottom 78 longitudinal edge having a rearwardly facing portion 81, 83. In this example, such rearwardly facing portion 81, 83 is contiguous with the top 72 and bottom 74 tabs formed by the front portion 68. The rearwardly facing portion 81 at the top edge 80 and rearwardly facing portion 83 at the bottom edge 78 of each vane structure 54 both serve as the general attachment location for the support sheer 52, as is described in greater detail below. The vanes 54 are operably attached to the support sheer 52 along the inwardly positioned upper 72 and lower 74 tabs in a manner to be described hereafter. The exposed or front face 76 of each vane, between the tabs 72, 74, has a length such that each vane 54 overlaps the adjacent underlying vane 54 when the covering is in the closed position. In the closed position, each vane 54 is substantially flat and generally parallel with the support sheer 52. It is contemplated that in some embodiments the overlap is not required and some exposed support sheer 52 could be seen between adjacent vanes 54, depending on the dimension of each vane 54 and the desired aesthetic look. Such variations in the final structure are contemplated by the apparatus and associated method as disclosed herein.

Each flexible operating element 56 hangs vertically substantially the entire length of the sheer 52 and is secured at spaced locations 58 along its length to the bottom tab 74 of each vane 54 so that if the operating elements 56 are lifted, the lower edge 78 of each vane 54 is lifted synchronously toward the upper tab 72 of each respective vane 54. This forms a gap or open space between the vanes 54 through which vision and/or light are permitted. As will be appreciated, since each vane 54 is made of flexible material, and generally bends along its longitudinal center when in an open position, movement of the bottom edge 78 toward the top edge 80 causes the vane 54 to fold or expand forwardly as seen, for example on FIGS. 1B and 1C. During this transition from a closed to an open position, the vane 54 in cross-section changes from being generally planer as shown in FIG. 1A in the closed position to arcuate in the open position as shown in FIG. 1C.

The flexible operating elements 56 are shown as monofilament cords but can assume other various forms, including but not limited to, strips of fabric or other material or cords of synthetic or natural fibers or the like. The operating elements 56 may have a variety of cross-sections, including circular, oval, rectangular, square, or other geometric shapes, and may even be irregular. The operating elements 56 need not be attached to every vane 54, but instead may be attached to any vane 54 that is desired to be moved between an open and closed position. The examples of the operating elements 56 provided here as well as elsewhere herein are considered means for operating in the context of this description and the appended claims.

The vanes 54 themselves may also be made of any suitable material, including, but not limited to, woven or nonwoven fabrics, vinyls, metal-hinged plate, or other such materials. Each vane 54 may also have a different configuration, such as being made of a single layer or multiple layers of material, or the flexibility of the material can vary from flexible and pliable to semi-rigid, having creases or hinges to allow the vane to bend or change configuration efficiently during operation and movement from the closed to open position. The examples of the vane 54 provided here as well as elsewhere herein are considered vane means for operating in the context of this description and the appended claims.

The support sheer 52 may be any flexible or pliable sheet of other materials of various structures and levels of transparencies (from opaque to clear), and may be woven or nonwoven and made of natural and/or manmade materials. The support sheer 52 may be characterized as a backing for the shade structure. The support sheer 52 may also be one or more support strips not continuous across the width of the shade. Such support strips may be monofilament cords, natural cords, strings or strips, or other types of discrete structures. The support strips may be equally or unequally spaced across the width of the vane. The support sheer 52 may also be made of strips of material attached or joined together, horizontally extending or vertically extending. The individual strips of material may be joined together along their side edges, or may overlap one another. The support sheer 52 may also be sections of horizontally extending substantially rigid material (slats) operably attached together, such as slats pivotally attached or connected together. "Together," in this context, includes adjacent to one another or spaced apart from one another. The slats can be made of plastic, wood, metal, or other suitable materials. The above-referenced support sheer, also referred to the support structure or backing, as well as other examples provided herein, are considered means for supporting in the context of this description and the appended claims.

The invention described herein primarily relates to the structure of the vane portion of the above-referenced shade, and the associated method of manufacturing such structure. It is contemplated that each of the examples of a base structure and the process of converting it into an operable vane structure described herein will operate to function as an operable vane in the structure described above, or a similar one, while providing an overall benefit of being operable in the shade.

In general, the conversion of a base structure to an operable vane structure includes the transition of the base structure by manual (human or simple tools) or automatic (computer controlled processes) means from an initial configuration to a final configuration having an operable vane. The base structure generally includes a back sheet, and a front sheet, with the front sheet being attached to the back sheet at spaced apart locations to form segments. The front sheet is then cut or sliced to form front strips having top edges still engaged with the back sheet, and bottom edges freely disassociated from the back sheet. Operating elements (at least one) are then positioned along the back sheet so as to be movable relative thereto, and so as to be movable relative to the top edge of each front strip. The operating elements are then affixed to the bottom edges (or adjacent thereto) of the front strips. The top of the back sheet and the upper ends of the operating elements are engaged with a roller as described above, and the bottom of the back sheet and the bottom ends of the operating elements are engaged with a common bottom rail (or separate bottom rail or weights). The front strips are then operable vanes which are controlled by the user to move between an extended or closed position to an open or retracted position relative to the back sheet. The operating elements are actuated by the roller.

Each of the examples provided herein have the common elements, or similar features, which allow the conversion of the base structure to a shade with operable vanes.

Figure 5:
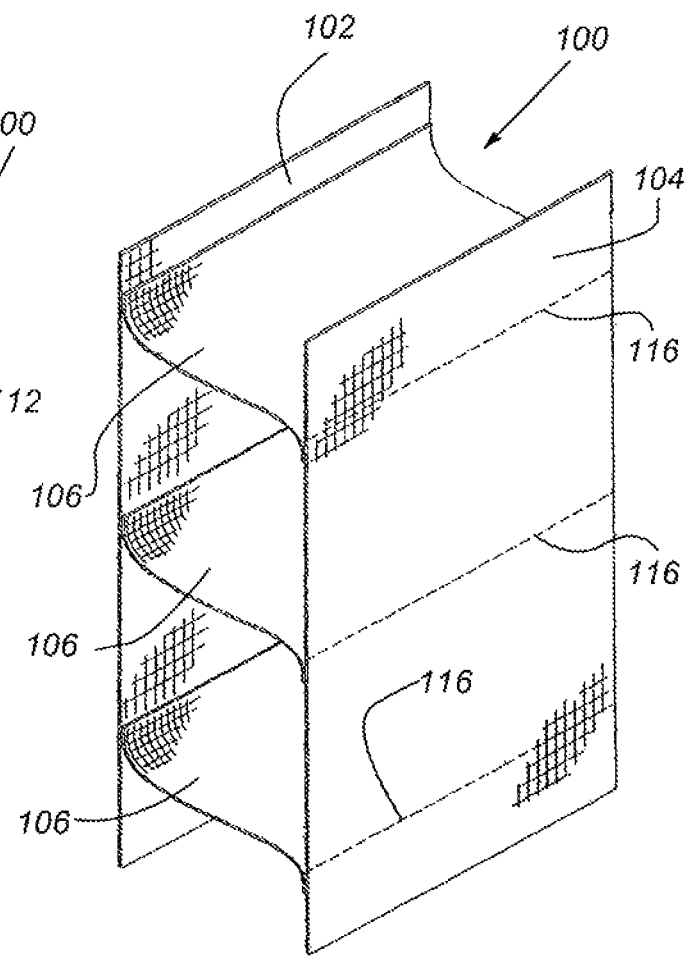
FIG. 5 shows a partial perspective view of the base structure shown in FIG. 4.
Figure 13:
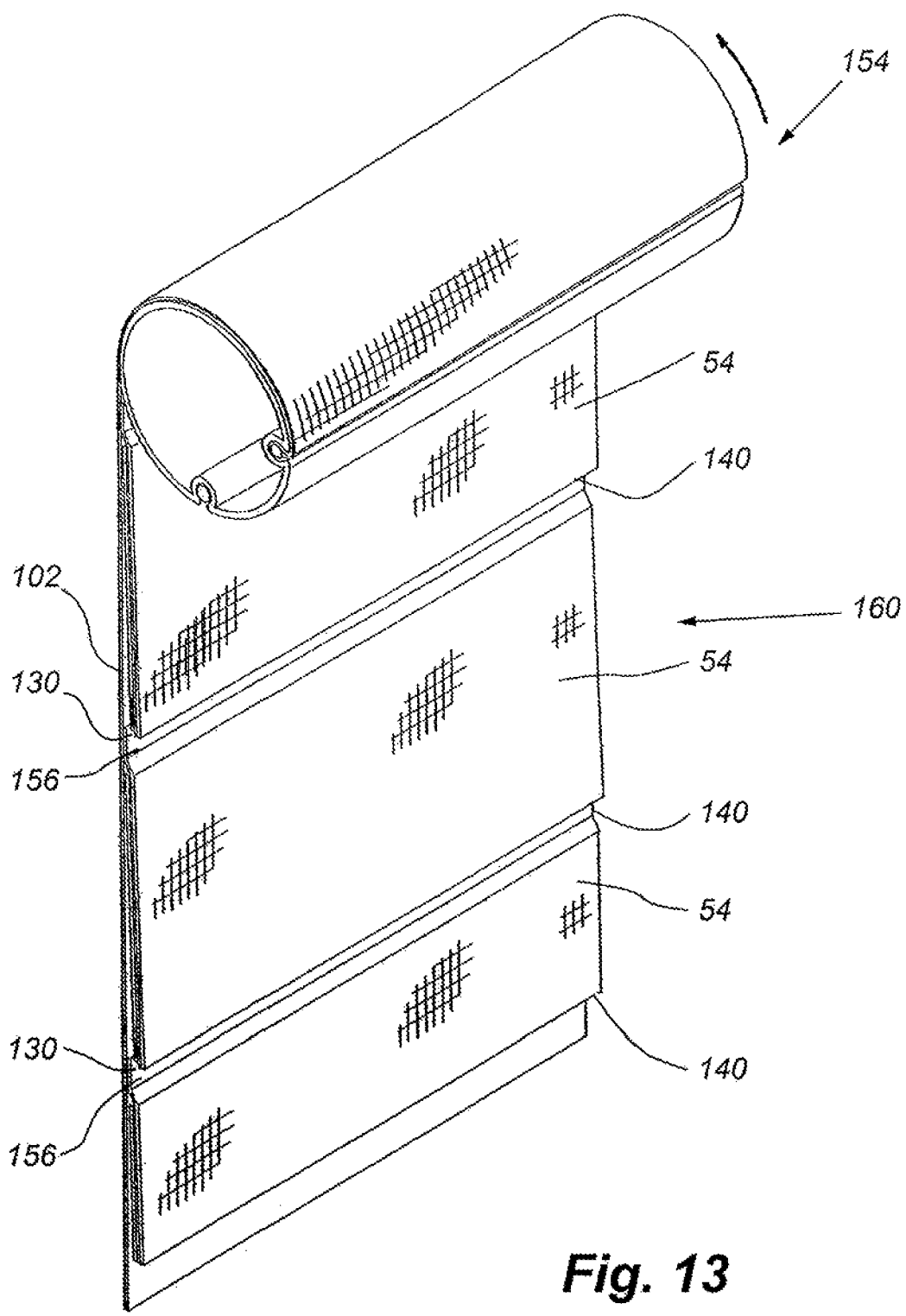
FIG. 13 shows the operable vane structure shown in FIG. 10 in the extended and closed position.
Figure 14:
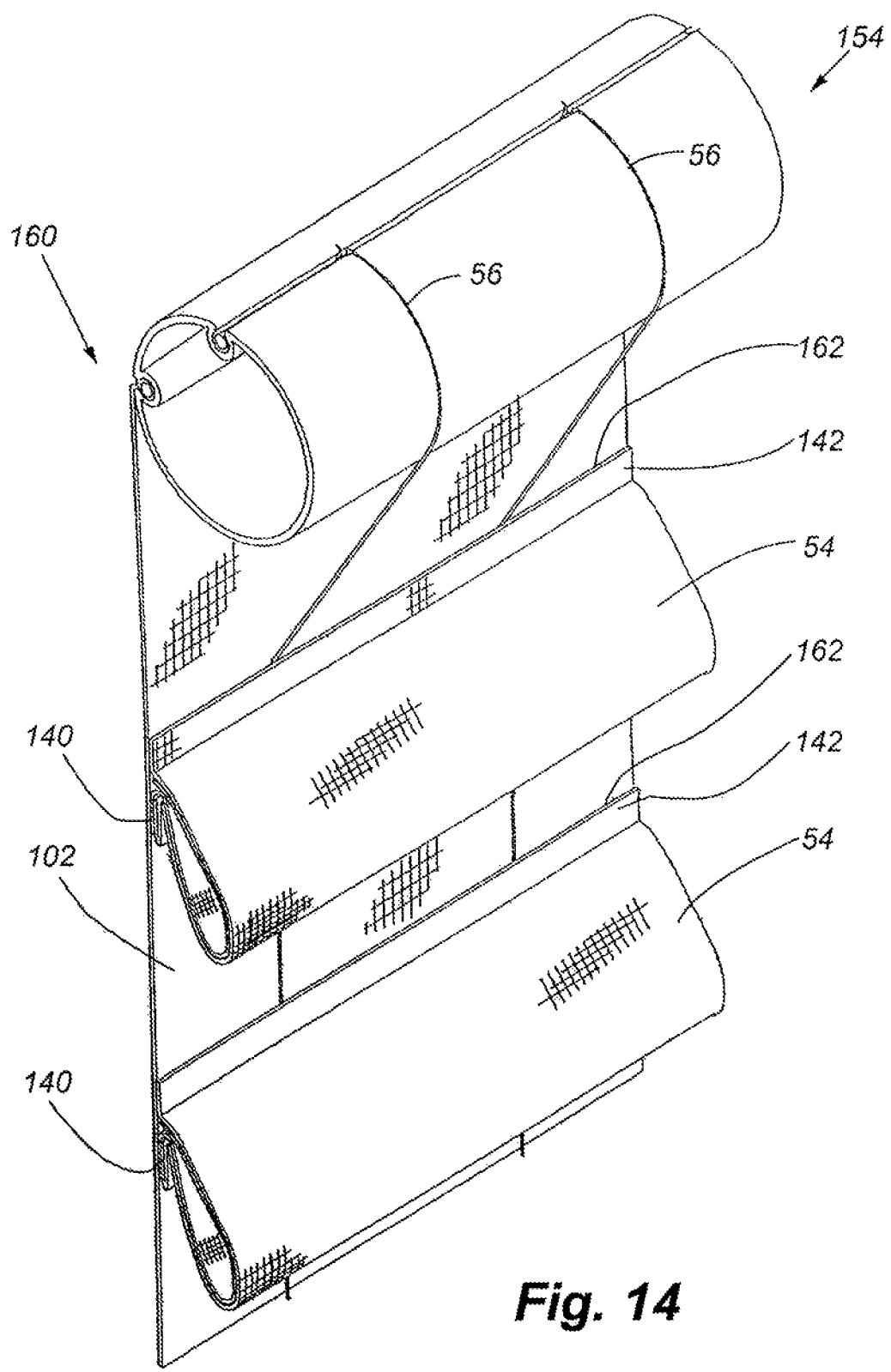
FIG. 14 shows the operable vane structure of FIG. 13 in the open position.

One example of a vane structure and associated method of making is shown in FIGS. 4 through 14. FIGS. 4 and 5 show the base structure 100 used to make the individual vanes 54 (as shown in FIGS. 13 and 14) operate in this example. The base structure 100 includes a back sheet 102, a front sheet 104 spaced away from the back sheet 102, and a plurality of intermediate strips 106 extending therebetween. One end of each intermediate strip 106 is attached to the back sheet 102 with the edge 110 of the intermediate strip 106 pointing upwardly, and the other end of the intermediate strip 106 is attached to the front sheet 104 with its front edge 112 pointing downwardly, generally forming an S shape. The front and rear edges 110, 112 of the intermediate strip 106 are attached to the backing strip 102 and the front sheet 104, respectively, by adhesive or by being woven together, or by some other type of attachment mechanism or means. In this structure, the back sheet 102 and the front sheet 104 are considered engaged together. The intermediate strip 106 facilitates this engagement, and forms an engagement region.

Figure 6:
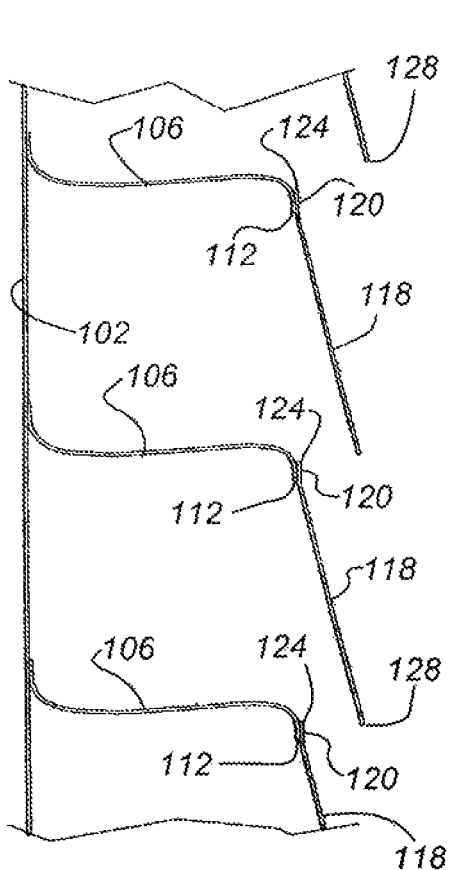
FIG. 6 shows a partial side view of the base structure shown in FIG. 4 after the front sheet is slit at discreet locations.
Figure 7:
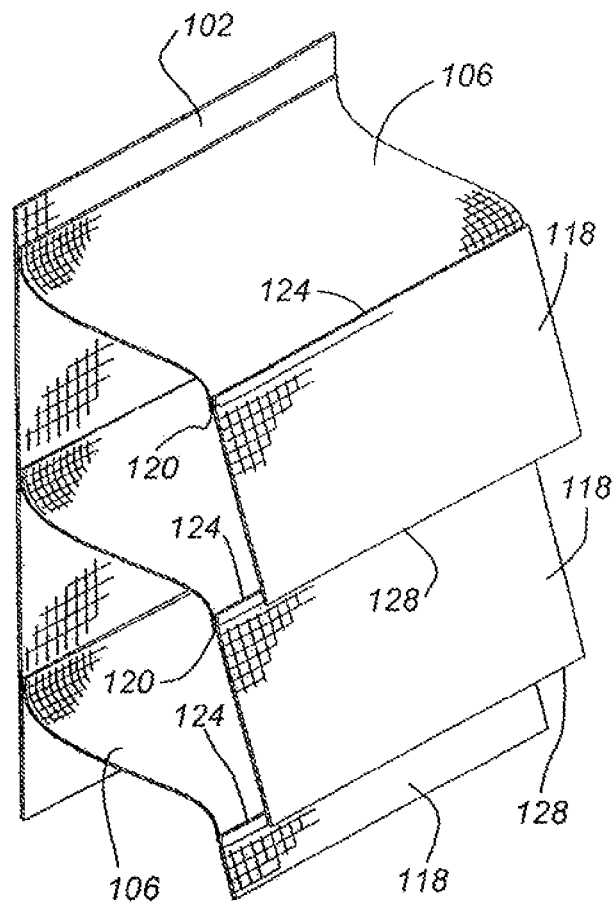
FIG. 7 shows a perspective view of the base structure shown in FIG. 6.

To convert this base structure 100 into an operable vane structure 160 (as shown in FIGS. 13 and 14), the front sheet 104 is slit or separated along a line of separation 116 at a position just above but adjacent to the attachment of the front edge 112 of the intermediate strip 106, generally along the dashed line 116 shown in FIG. 5. By slitting or cutting the front sheet along these lines 116, individual horizontal flaps 118, or front strips, are formed as shown in FIGS. 6 and 7. The line of separation 116, for this example and for the other examples herein, may be linear, curved, non-continuous, or linear segments connected at angles. The separation may be by cutting, slicing, tearing, removal of stitching, or other suitable means.

In FIGS. 6 and 7, the intermediate strip 106 and the newly-formed front strip 118, are attached to and depend forwardly from the back sheet 102. The front strip 118 is still in engagement with the intermediate strip 106, and generally forms a continuous member. As shown in FIGS. 6 and 7, the overlapping areas of engagement 120 between the front strip 118 and the intermediate strip 106, along their adjacent edges 124, 112, may be double the width of the main body portion of the intermediate strip 106 or the front strip 118, and thus provide some localized structural benefit.

Figure 8:
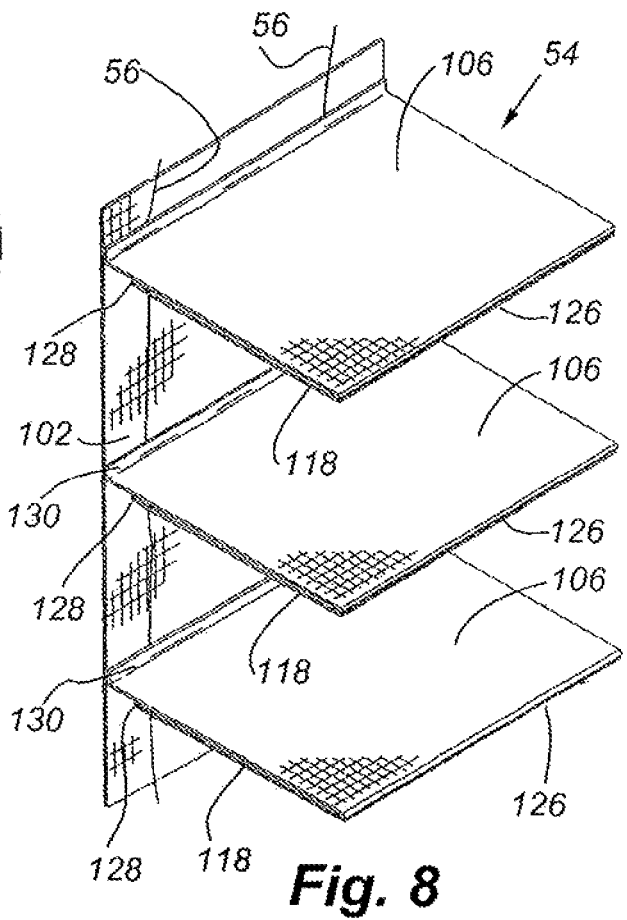
FIG. 8 shows the base structure shown in FIG. 7 having the front strips formed into dual layer vanes.

FIG. 8 shows another step in forming operable vanes from this base structure. In FIG. 8, the front strip 118 is bent towards the back sheet 102 along a fold line 126 just above the intersection between the intermediate strip 106 and the front strip, such that the overlapping edges of the front strip 118 and the intermediate strip 106 are on the behind, or back side, of the vane 54 (the folded together intermediate strip and front strip), and positioned towards the back sheet 102. The previously free terminal edge 128 of the front strip is shown adjacent to and positioned near the back sheet 102.

At least one operating element 56 extends down the surface of the back sheet 102 and is threaded through the back sheet 102 just above the intersection 130 of the vane 54 and the back sheet 102 and then threaded back through to the front side of the back sheet 102 just below the intersection of the vane 54 and the back sheet 102 at each vane 54.

Figure 9B:
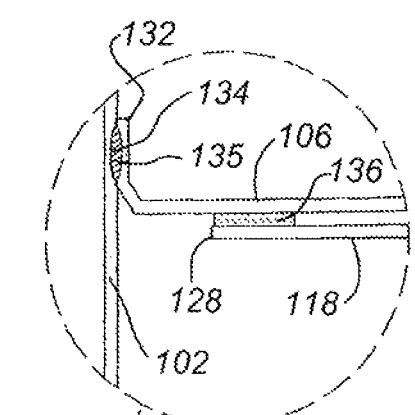
FIGS. 9A, 9B and 9C show the adhesion location of the base structure shown in FIG. 8.
Figure 9A:
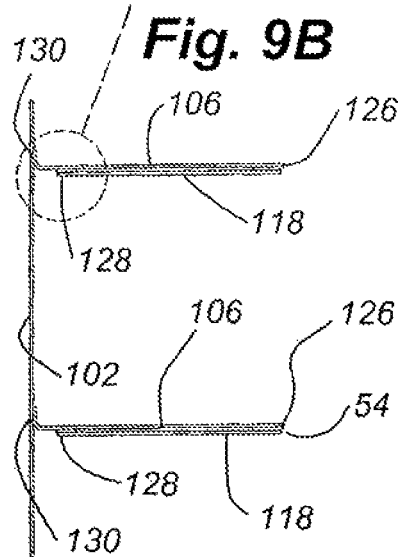
Figure 9C:
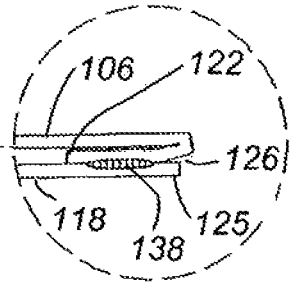

FIGS. 9A, B and C show another step in forming operable vanes from the basic structure show in FIG. 4. In FIGS. 9A and 9B, which are generally a side views of FIG. 8, the terminal edge 128 of the front strip 118 is attached to the back of the intermediate strip 106 by adhesive, glue, sewing, or other type of attachment mechanism or means. The attachment 136 between the terminal edge 128 and the intermediate strip 106 can be continuous along the length of the vane 54 or may be intermittent. This attachment 136 is shown in detail in FIG. 9B, along with the attachment 134 of the rear edge 132 of the intermediate strip 106 to the back sheet 102, in this example shown as a line of adhesive 135 positioned therebetween. FIG. 9C shows that the attachment 138 between the front edge 122 of the intermediate strip 106 and the front edge 125 of the front strip 118 maintains its integrity, and may be formed as a continuous point of connection along the length of the vane 54 or may also be intermittent. In this case, it is also shown as an adhesive line 138 positioned therebetween.

FIG. 10 shows another step of the conversion of the base structure shown in FIG. 4 into an operable vane structure 160. In FIG. 10, the newly-formed vane 54 is in its fully extended position with the operating elements 56 extending along the back sheet 102 as described above. The folded edge 140 of each vane 54, as shown in FIG. 10 along the bottom of each vane 54, is attached to the operating element 56 as detailed in FIGS. 11 and 12. In FIGS. 11 and 12, the operating element 56 is shown extending down the front side of the back sheet 102 and extending through the back sheet 102 just above the engagement 130 of the vane 54 with the back sheet 102 and then extending back to the front side of the back sheet 102 just below that engagement line 130 between the vane 54 and the back sheet 102. The operating element 56 then extends between the vane 54 and the back sheet 102 down to the next attachment line 130 between the vane 54 and the back sheet 102 of the adjacent lower vane 54 and again passes through to the rear side of the back sheet 102 around the attachment line 130 with the vane 54 and then again passes back through to the front of the back sheet 102. This continues for each vane 54 to which the operating element 56 is intended to be connected.

As shown in FIG. 12, the bottom edge 140 of each vane 54 is attached to the operating element 56 by any suitable means that does not also attach the operating element 56 to the backing sheet 102. For instance, one-sided tape or an adhesive 148 that hardens and does not adhesively engage the backing sheet 102 can be used to attach the operating element 56 to the bottom of the operable vane 54. FIG. 12 shows, in detail, the portion of the vane 54 in FIG. 11 where the adhesive 148 is used to attach the operating element 56 to the back side of the lower edge 150 of the operable vane 54. The operating element then extends through the back sheet 102 to the rear side of the back sheet 102, and then back to the front side of the back sheet 102 underneath or below the attachment line 130 of the next adjacent lower vane 54 to the back sheet 102. The adhesive 148 used to attach the operating element 56, again, is designed to not engage the back sheet 102, but to attach the operating element 56 to the operable vane 54, such as at the bottom edge 140 thereof, in order to actuate the operable vane 54 as described above and herein below.

The formation of the operable vane 54 structure from the base structure shown in FIG. 4 is now complete and, when attached to a top roller 154 as shown in FIG. 13 and bottom weights or rails as described herein, forms an operable vane structure 160.

FIG. 13 shows this example of the vane structure 160 having been formed from the basic structure of FIG. 4. FIGS. 13 and 14 show the vane structure 160 in operation. In FIG. 13, the backing sheet 102 is attached to the roller 154 in the manner described above, and the operating elements 56 are attached to the roller 154 by the manner described above with respect to FIGS. 2 and 3. When the roller 154 is in the position shown in FIG. 13, the operable vanes 54 are in their extended and closed position. Note that in this embodiment, some gap 156 may be formed between the bottom 140 of each vane 54 and the next adjacent lower vane 54. FIG. 14 shows the operable vane structure 160 in its open or retracted position, with the upper roller 154 rotated counter-clockwise with respect to FIGS. 13 and 14 in order to actuate the operable vanes 54 with the operating element 56. As the upper roller 154 is rotated, the operating element(s) 56 are rotated away from the engagement of the back sheet 102 with the roller 154 and thus the operating elements 56 are pulled upwardly relative to the back sheet 102. As the operating elements 56 are pulled upwardly, the operating elements 56 move relative to the back sheet 102. As shown in FIG. 14, since the operating elements 56 are attached along the bottom edge 140 of each of the newly-formed vanes 54, the bottom edge 140 of the vanes 54 are pulled up towards the attachment line 130 of the top edge 162 of the vane 54 to the back sheet 102. Because the operating elements 56 extend through the back sheet 102 behind the attachment line 130 of the vane 54 to the back sheet 102 and then back through the back sheet 102 towards the front of the back sheet 102 down to the next vane 54, the operating elements 56 are allowed to move relative to the back sheet 102 and actuate the movable vane 54. In the embodiment shown in FIGS. 4 through 14, it should be noted that the various steps for converting the base structure 100 as shown in FIG. 4 into the final structure 160 shown in FIGS. 11 through 14 can be performed automatically or manually, and in a variety of orders. For instance, the splitting of the front sheet 104 into front strips 118 can be performed automatically or manually. Also, the extension of the operating element 56 along the back sheet 102 with its transmission through the back sheet 102 and around each attachment line 130 of the newly-formed vane with the back sheet 102 to allow the operating element 56 to move relative to the back sheet 102 can be performed automatically or manually. The stringing of the operating element 56 along the back sheet 102 may be done manually or automatically with a machine. It should be noted that the extension of the operating element 56 along the back sheet 102 may not have to go around each attachment line 130 of each newly-formed vane 54 in the back sheet 102 by extending through the back sheet 102, as described above, and instead the operating element 56 could be directed directly through the top edge 162 of the newly-formed vane, just below the attachment point 130 or through the attachment point 130 of the vane to the back sheet 102 as long as the operating element 56 was able to move relative to the back sheet 102. The top 162 edge of the newly-formed vane 54 maintains sufficient connection with the back sheet 102 in order to stay stationary when the operating elements 56 are actuated and pulled up or moved downwardly with respect to the back sheet 102 to actuate the bottom edge 140 of the operable vane 54.

Figures 15, 16, 17:
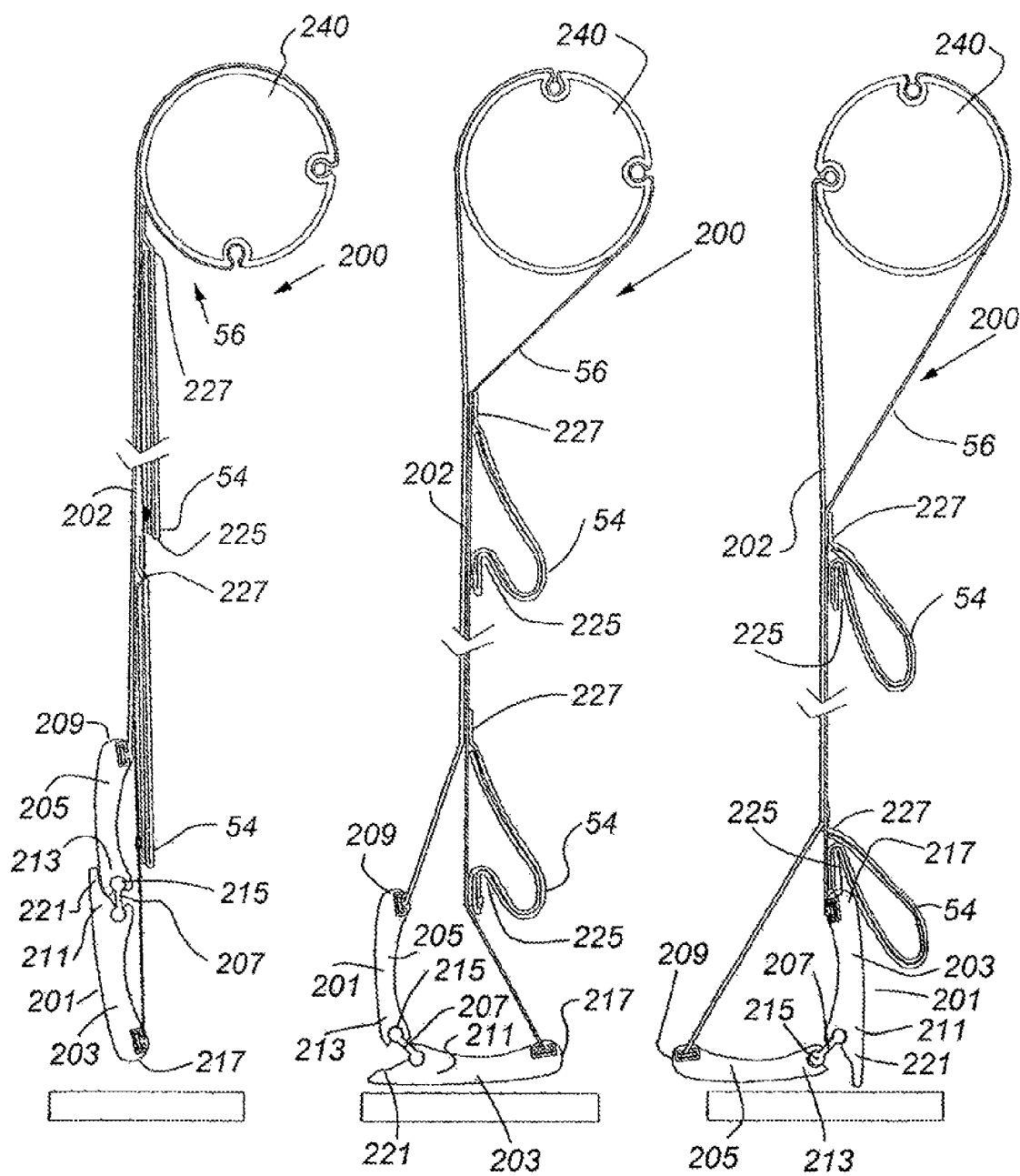
FIGS. 15 through 17 show side views of an articulated bottom rail attached to the bottom of a shade, with the operable vane structures in the extended closed position, the extended intermediate position, and in the open position respectively.

FIGS. 15 through 17 show one embodiment of a bottom rail 201 that is useful in a shade structure 200 having operable vanes 54. The bottom rail 201 includes two portions, a front portion 203 and a rear portion 205, which are articulatable with respect to one another about a link connection member 207 that rotatably connects the front and rear portions 203, 205 of the bottom rail 201 to one another. As shown in FIG. 15, the operating element 56 is attached to the front edge 217 of the front portion 203 of the bottom rail 201 and the back sheet 202 is attached to the rear edge 209 of the rear portion 205 of the bottom rail 201. The rear portion 211 of the front rail 203 and the front portion 213 of the rear rail 205 are attached together by a link member 207, which in this embodiment has ball-shaped ends 215 to be received in corresponding socket shapes on each appropriate edge 211, 213 of the bottom rail portion 201. This structure allows the front and rear portions 203, 205 of the bottom rail 201 to articulate relative to one another during the operation of the operable vane shade structure 200.

For instance, FIG. 15 shows the bottom rail 201 when the operable vane structures 200 are in their closed or extended position. In this orientation, the bottom rail 201 extends vertically with the front portion 203 closest to the window sill and the rear portion 205 extending relatively vertically above it. The rear edge 211 of the front portion 213 of the bottom rail 201 has a flange 221 that extends beyond the connection with the link 207 to overlap the front edge 213 of the rear portion 205 of the bottom rail 201 in order to keep the rear portion 205 from articulating too far past the linear position as shown in FIG. 15, yet it allows it to articulate forwardly as shown in FIGS. 16 and 17. The flange 221 engages the front edge 213 of the rear portion 205 as well as some width of the rear portion 205 in order to support it from hinging to the left relative to the orientation of FIG. 15.

FIG. 16 shows the articulating bottom rail 201 in the position where the operable vanes 54 are in an intermediate position. In FIG. 16, the front portion 203 of the bottom rail 201 extends along the windowsill, and is generally parallel thereto, while the rear portion 205 of the bottom rail 201 extends upwardly at approximately a 90 degree angle. The connector link 207, with its ball and socket structure, helps limit the angle to which the front and rear portions of the bottom rail 201 can bend towards each other, based on the structure of the socket each end of the link 207 is positioned in. The wall of the socket, in the most extreme bent position, such as in FIGS. 16 and 17, engages the neck of the link 207 adjacent to the ball 215 portion in order to keep the two sections 203, 205 of the bottom rail 201 from bending any closer together than this direction.

In FIG. 17, the operable vanes 54 are shown in the retracted or open position with the appropriate different orientation of the control roller 240 which has actuated the operating elements to their fullest extent and moved the bottom edge 225 of each vane up towards the top edge 227 of each vane 54. In this position, the front portion 203 of the articulating bottom rail 201 is held in a relatively vertical position, with the rear portion 205 of the bottom rail 201 extending generally rearwardly. It is important to note that in this configuration, the flange 221 extending from the rear edge 211 of the front portion 203 of the bottom rail 201 maintains close proximity to the window sill to minimize or control the amount of light passing there through. Also note in FIGS. 15 and 16, that the bottom rail 201 stays relatively close to the window sill to control the light passing therebetween. This close positioning between the bottom rail 201 and the sill controls the amount of light passing between the bottom rail 201 and the sill regardless of the position of the operable vanes 54 in the closed position, the intermediate position, or the open position.

It is contemplated that the back sheet 202 as well as the operable vanes 54 may be weighted separately, or together, by a bottom rail 201, and that the bottom rail 201 does not need to be articulated, and instead can be one member or two separate members. Additionally, each operating element 56 may have its own weight.

Figures 18, 19, 20:
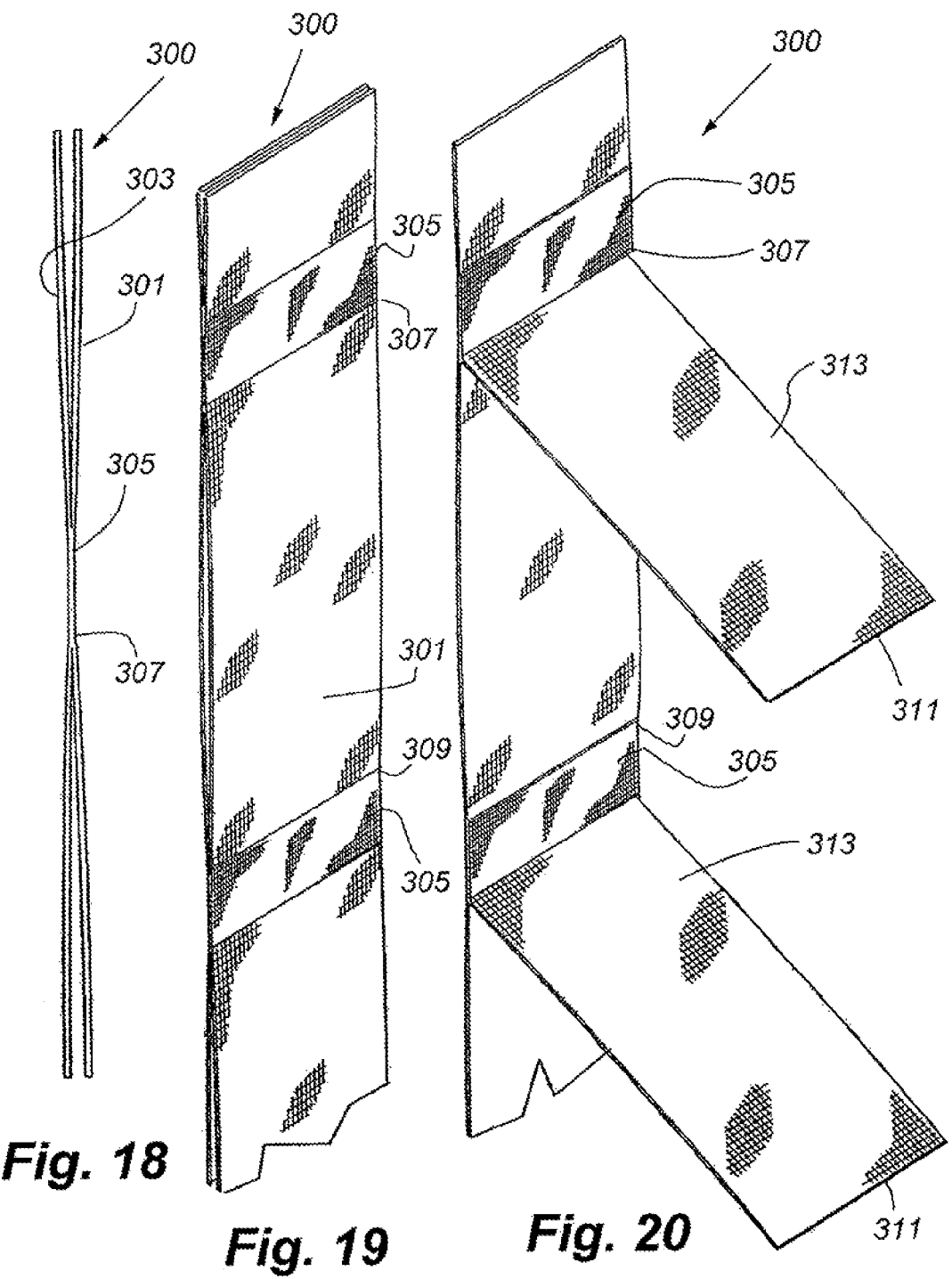
FIG. 18 shows a second example of a base structure prior to conversion to an operable vane structure.
FIG. 19 shows a partial perspective view of the base structure shown in FIG. 18.
FIG. 20 shows a partial perspective view of the base structure shown in FIG. 18, after the front sheet of each section has been slit as part of the process of converting the second example of the base structure into a movable vane structure.
Figures 25A, 25B, 26, 27:
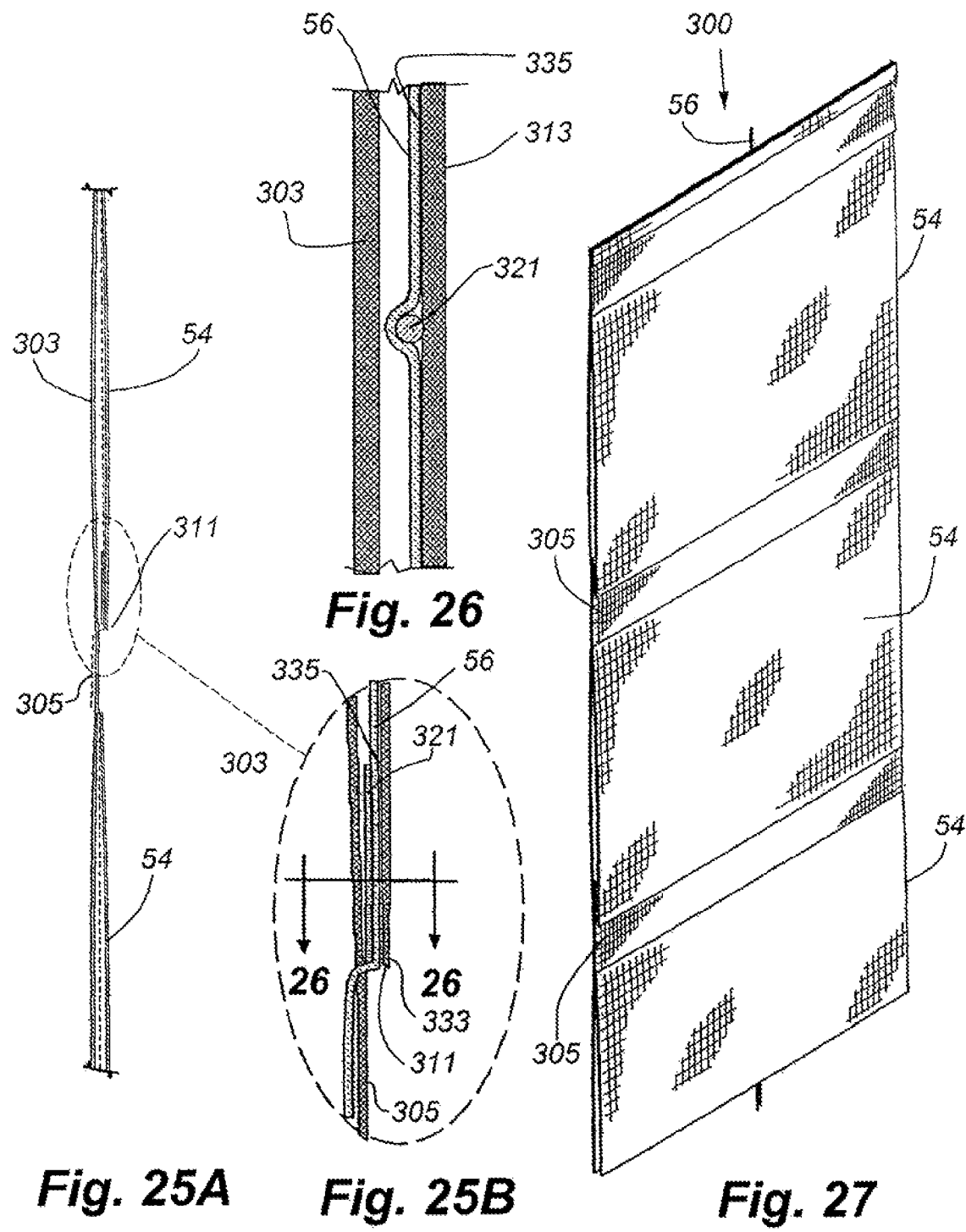
FIG. 25A is a side view of the operable vane structure having been converted from the base structure shown in FIG. 18.
FIG. 25B is an enlarged portion of the operable vane structure of FIG. 25A.
FIG. 26 is a cross-section view of the operable vane structure shown in FIG. 25B, as taken along line 26-26 of FIG. 25B.
FIG. 27 is a perspective view of the completed operable vane structure shown in FIG. 25A.
Figure 28A:
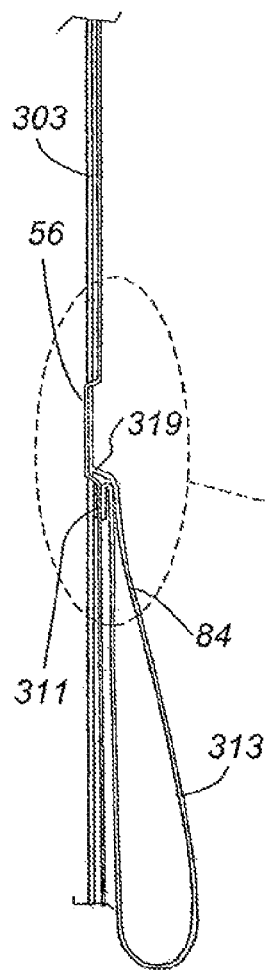
FIG. 28A is a side view of the completed operable vane structure shown in FIG. 27.
Figure 28B:
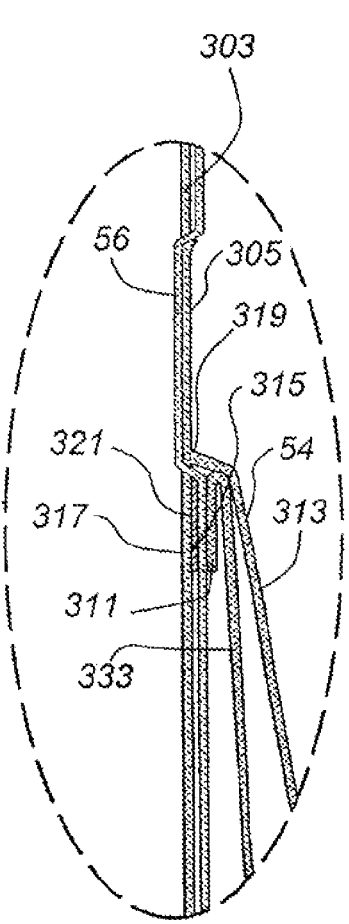
FIG. 28B is an enlarged view of the completed operable vane structure shown in FIG. 28.
Figure 29:
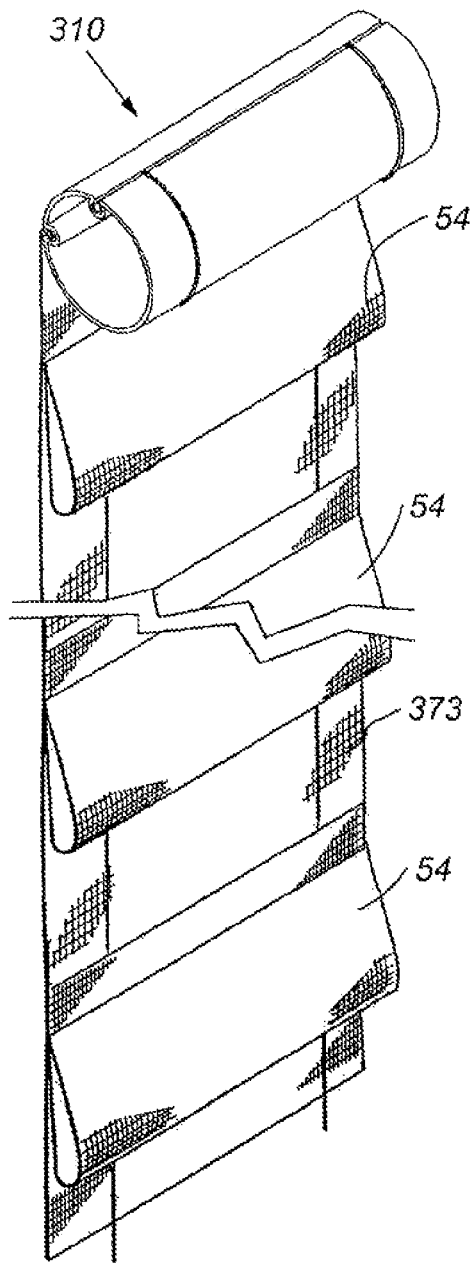
FIG. 29 is a perspective view of the completed shade shown in FIG. 27, with the operable vane structure in an open position.

FIGS. 18 through 32 show the operable vane structure 310 (as shown in FIGS. 27-29) being constructed from a different base structure 300 than disclosed above. FIG. 18 shows the base structure 300 of this example, which includes a front sheet 301 and a back sheet 303 which intermittently come together as one layer at woven intersections 305. The front sheet 301 and back sheet 303 may be woven material, and at the places where they come together to form one layer they are woven as one in those intermittent positions. The back sheet 303 and front sheet 301 from top to bottom thus forms alternating dual-layer sections or a series of dual-layer sections separated by a single layer section, as shown in FIGS. 18 and 19. This base structure 300 is also able to be formed into an operable vane structure.

The interwoven portions that separate the dual layer portions serve to separate adjacent vane structures 54 (as shown in FIGS. 27-29) after the vane structures 54 have been formed.

In order to convert this base structure 300 to an operable vane structure 310, the base structure 300 may be sliced or cut along the bottom edge 311 of the front portion 301, either along or adjacent to the top edge 307 of the interwoven section 305 along the width of the back sheet 303. By slitting the front sheet in this location, a front tab 313 or strip is formed with its top end 307 attached to the back sheet 303 at the bottom of the interwoven portion 305, and the bottom edge 311 free as shown in FIG. 20. As many of these front sheets 301 are sliced as is desired to have operable vanes along the length of the base structure 300. This is shown in FIG. 20. The slicing can be done with a scissor, knife, razor, or any other type of cutting mechanism, and can be done manually or automatically by machine.

Figures 21, 22:
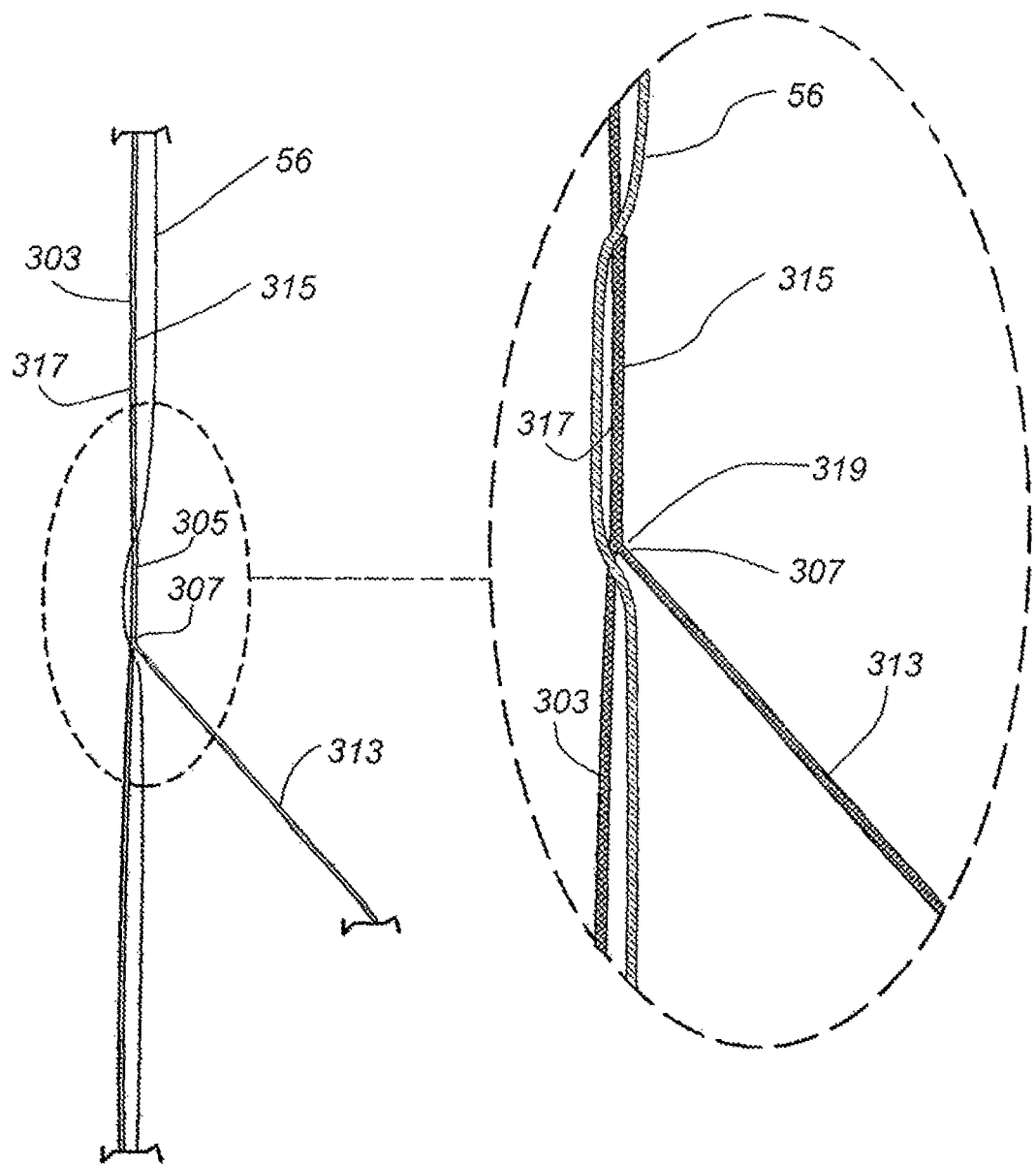
FIG. 21 shows a partial side view of the base structure shown in FIG. 18, after the control element has been routed along the back sheet.
FIG. 22 shows an enlarged portion of the base structure shown in FIG. 21, and shows the operating element passing from the front of the back sheet through to the back of the back sheet, along the back side of the interwoven portion of the back sheet, and then passing back through the back sheet to the front of the back sheet.

FIG. 21 shows another step in converting this base structure 300 into an operable vane structure 310, and includes adding the operable elements 56 to the back sheet 303 after the slitting step has been performed. The operable elements 56 could also be added prior to the slitting structure if desired. In adding the operating elements 56 to the back sheet 303, the operating elements 56 are brought to extend down the front side 315 of the back sheet 303 to above the line of connection between the front strip 313 and the interwoven portion 305. Here, the operating element 56 passes through the back sheet 303 to the rear side 317 of the back sheet 303 to a position below the intersection of the top edge 307 of the front strip 313 and the back sheet. At this point, the operating element 56 is then passed back through the back sheet 303 to extend along the front side 315 of the back sheet 303 down to the next vane section where it repeats the transition. This layout of the operating element 56 is shown in FIGS. 21 and 22. FIG. 22 is an enlarged portion of FIG. 21, and shows in greater detail the path of the operating element 56. It should be noted that the operating element 56 could pass through the backing sheet 303 just above and adjacent to the attachment line 319 between the front strip 313 and the back sheet 303, and thereby pass through the interwoven portion 305. Alternatively, the operating element 56 could pass directly through the top region 307 of each front strip 313 and not pass through to the back side 317 of the back sheet 303 if desired. The operating element 56 thus can move along the length of the back sheet and relative to the back sheet 303 when actuated, as described herein below.

Another step in converting the base structure 300 to an operable vane structure 310 includes applying an adhesive 321 to connect a portion of the operating element 56 to the bottom 311 of the front sheet 313 in order to cause or allow the controlled movement of the bottom 311 of the front sheet 313 to form the operable vane structure 310. As shown in FIG. 23, in one example, a single sided sticky adhesive tape 322 is positioned between the back sheet 303 and the operating element 56 just prior to the location or above the location where the operating element 56 passes through the back sheet 303. The side 323 facing the operating element 56 has adhesive 321, and the side 325 facing the back sheet 303 is able to move relative to the back sheet 303 and does not attach to the back sheet 303.

FIGS. 24A and B show a cross section of FIG. 23 in order to diagram the layout of the operating element 56 along the back sheet 303. FIG. 24A shows segments of the operating element 56 in dashed line. As shown in FIG. 24A, the operating element 56 alternates from the front side 315 of the back sheet 303 to the back side 307 of the back sheet 303 and back through the front side 315 of the back sheet 303 in order to bypass the engagement region 305 (or inter-woven portion) of the front strip 313 with the back sheet 303. FIG. 24B shows in greater detail the operating element 56 as it passes over the adhesive 321, which is positioned between the operating element 56 and the back sheet 303. Just below the position of the adhesive 321, the operating element passes through from the front side 315 to the back side 307 of the back sheet 303 in order to go behind the interwoven region 305 between the front strip 313 and the back sheet 303. FIG. 24B shows the operating element passing through the top of the interwoven portion 305 just adjacent to the bottom 330 of the adhesive strip 321 that attaches the operating element 56 to the bottom 311 of the front strip 313. Aesthetically this may be more pleasing, however, the operating element 56 may pass on the front side of the interwoven portion 305 and pass through to the back side 307 of the back sheet 303 closer to the engagement line 319 of the front strip 313 with the back sheet 303 if desired.

FIGS. 25A and B show the sandwich structure layer of the base structure 300 converted to an operable vane structure 310, where the back sheet 303 supports the operable vanes 54 and the operating element 56. The operating element 56 is attached near the bottom edge 311 of the operable vane 54 (and of the front strip 313) by the adhesive strip 321. The adhesive strip 321 again does not engage the back sheet 303, but only attaches the operating element 56 to the back side 335 of the bottom edge of the front strip 313 in order to allow the bottom edge 311 of the front strip 313 to move up and down under the control of the motion of the operating element 56 as moved by the user. FIG. 25B shows the bottom edge 311 of the front strip 313 with the operating element 56 extending therealong and an adhesive layer 321 attaching the operating element 56 to the back side 335 of the bottom edge 311 of the front strip, and the backing sheet 303 supporting that layer. The operating element 56 passes downwardly beyond the adhesive strip 321 as well as the end 311 of the front strip 313 and extends rearwardly through the back sheet 303 at the top of the interwoven segment 305 as described above.

FIG. 26 shows a cross section taken along line 26-26 of FIG. 25B which discloses the adhesive strip 321 holding the operating element 56 to the back side 335 of the bottom edge 311 of the front sheet 313 and not being attached to the back sheet 303. The operating element 56, as noted above, may be attached to the front strip 313 by using this adhesive strip 321, or by using other types of adhesive or attachment mechanisms that would attach the operating element 56 to the front strip 313 without attaching the operating element 56 or the front strip 313 to the backing sheet 303. Other types of adhesive mechanisms may be stapes, sewing, glue, or other such adhesive or attachment means.

The base structure shown in FIG. 18 is thus converted into an operable vane structure 310 shown in FIG. 27. The operable vane structures 310 are positioned adjacent to one another with the interwoven sections 305 positioned between the adjacent vane structures 54. The operable vane structures 54 are shown in the closed position in FIG. 27. In this example, the operable vane structure 54 is of a single layer as opposed to double layer in the earlier examples and as such may form a more draping looped shape as shown in FIG. 28 when moved to the collapsed or open position.

FIGS. 28A and B show the converted operable vane structure 310 in its most open position with the operating elements 56 retracted to cause the bottom edge 311 of each front strip 313 forming the vane 54 moved upwardly. FIG. 28B shows a close-up of FIG. 28A, and illustrates the operating element 56 passing down the front 315 of the back sheet 303 to just above and adjacent the interwoven section 305 where it passes through the back sheet 303 to the back side 317 of the back sheet 303 and behind the interwoven section 305 to below the intersecting line 319 of the front strip 313 with the back sheet 303 which is at the bottom of the interwoven section 305. Just below that intersection line 319, the operating element 56 passes back through to the front side 315 of the back sheet 303 and continuously extends downwardly to the next interwoven section 305. As shown in FIG. 28B, when the operable vane 54 is in the retracted or open position, the portion of the operating element 56 attached to the bottom 311 of the vane 54 is positioned up near the portal where the operating element 56 passes from the back side 317 to the front side 315 of the back sheet 303. In this particular embodiment, the operating element 56 has been attached to the back side 335 of the bottom edge 311 of the front strip 313 to create a looped shape when the operable vane 54 is moved into its open or retracted position. Alternatively, the operating element 56 may also be attached to the front side 333 of the bottom edge 311 of the front strip 313, and, when retracted, would have a shape different than that shown in FIGS. 28A and B, and FIG. 29.

FIG. 29 shows the perspective view of the operable vane 54 in the retracted or open position forming a draped loop shape.

Figures 30, 31, 32:
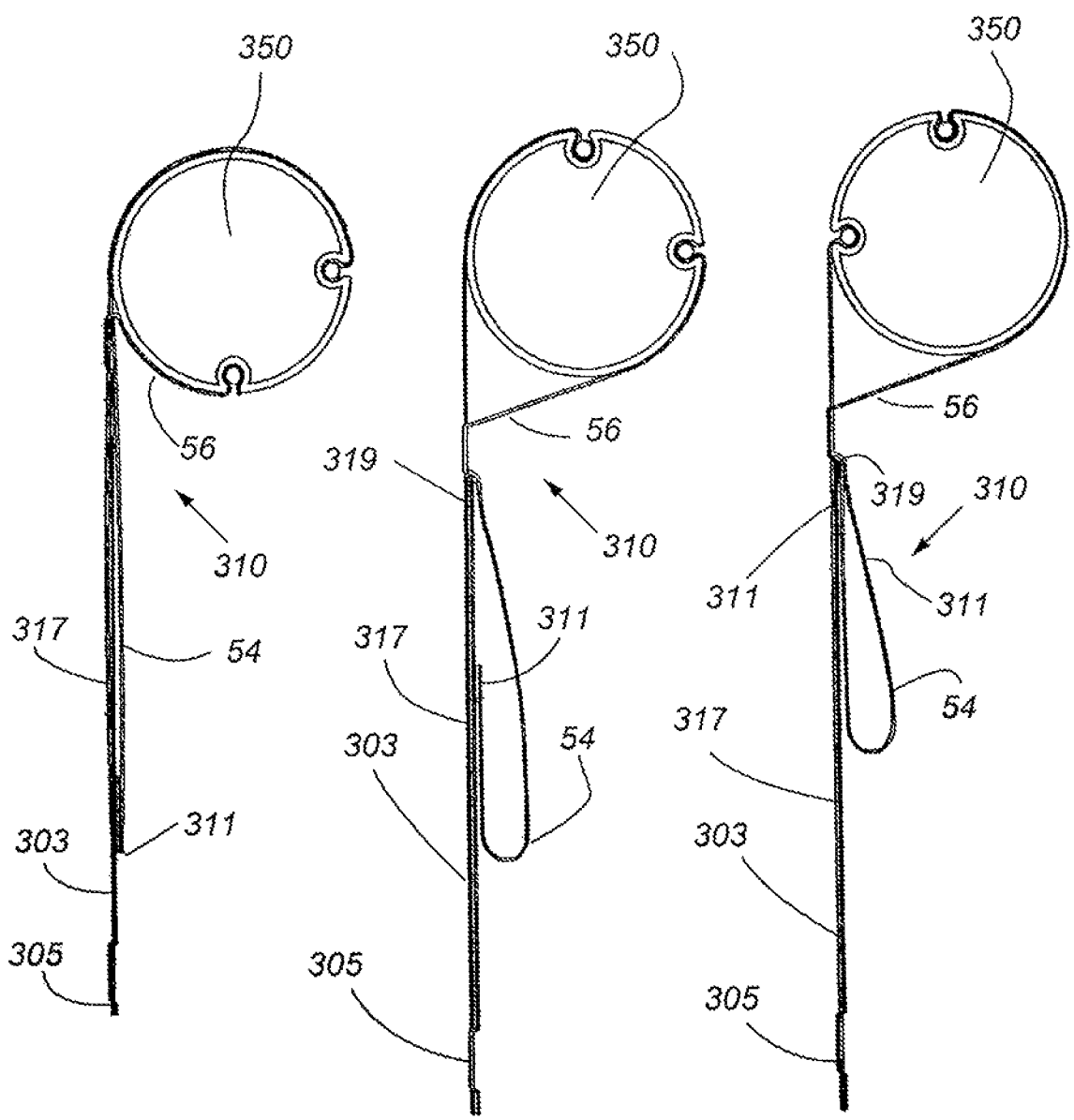
FIGS. 30, 31, and 32 show side views of the completed vane structure of FIG. 27 in a closed position, partially open position, and fully open position respectively.

FIGS. 30 through 32 show the operation of the converted base structure 310 when made into an operable vane structure 310 as described above. FIG. 30 shows the operable vane structure 310 in the closed position with the operable vanes 54 extended. The roller 350 operates in the same manner as described earlier with respect to FIGS. 2 and 3 and an earlier embodiment. In this configuration, each operable vane 54 is separated from the adjacent vanes 54 below and above by the interwoven portion 305 of the back sheet 303. The interwoven portion 305 of the back sheet 303 is either more densely knitted or has a double thickness, than the other portions of the back sheet 303, so the transmission of light through the interwoven portion 305 is likely reduced and thus lessens the striping effect when light is transmitted through the shade with the operable vanes 54 in the closed position. FIG. 31 shows the operable vanes 54 in the intermediate open position, where the operating element 56 has been pulled upwardly relative to the back sheet 303. FIG. 32 shows the operable vanes 54 in the fully open position with the operating element 56 having been actuated to be moved upwardly to pull the engagement between the operating element 56 and the bottom edge 311 (whether or not attached to the front 333 or the rear side 335 of the bottom edge 311 of the strip 313) up to the passage through the back sheet 303 of the operating element 56 which is the top limit of travel of the operating element 56. Again, the operating element 56 may pass directly through the top 307 of the front strip 313 as opposed to passing to the back side 317 of the back sheet 303 if desired. The interwoven portion 305 in this base structure may also include regions where a front sheet 313 is attached to a back sheet 303 by adhesive or another mechanism or manner. The conversion of this different structure to an operable vane structure 310 would be along the same lines as described above.

Figures 33, 34, 35:
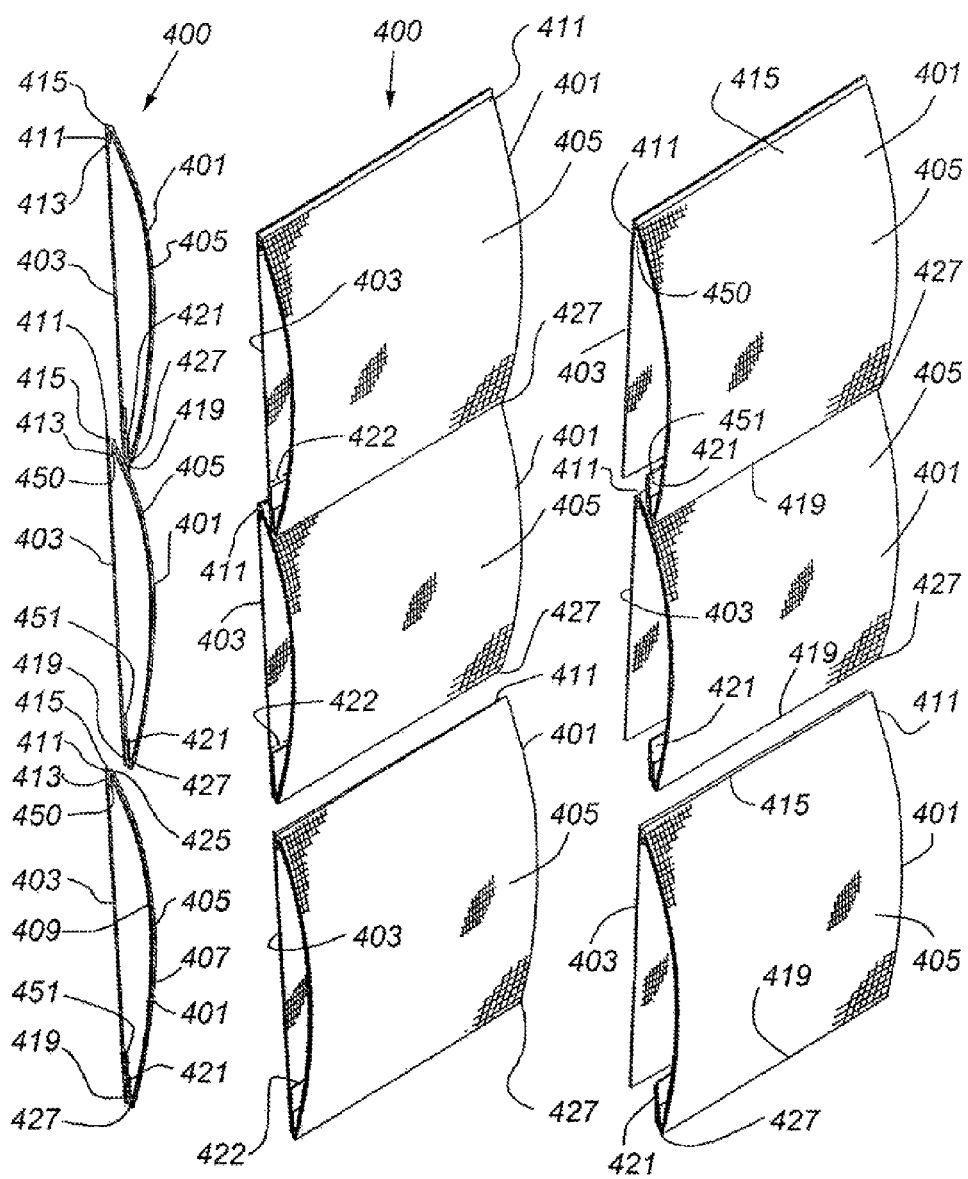
FIG. 33 shows a third example of a base structure prior to conversion into an operable vane structure.
FIG. 34 shows a perspective view of the base structure shown in FIG. 33.
FIG. 35 shows each segment of the base structure of FIG. 33 after having been slit along the desired line to start the conversion of the base structure into an operable vane structure.
Figure 37:
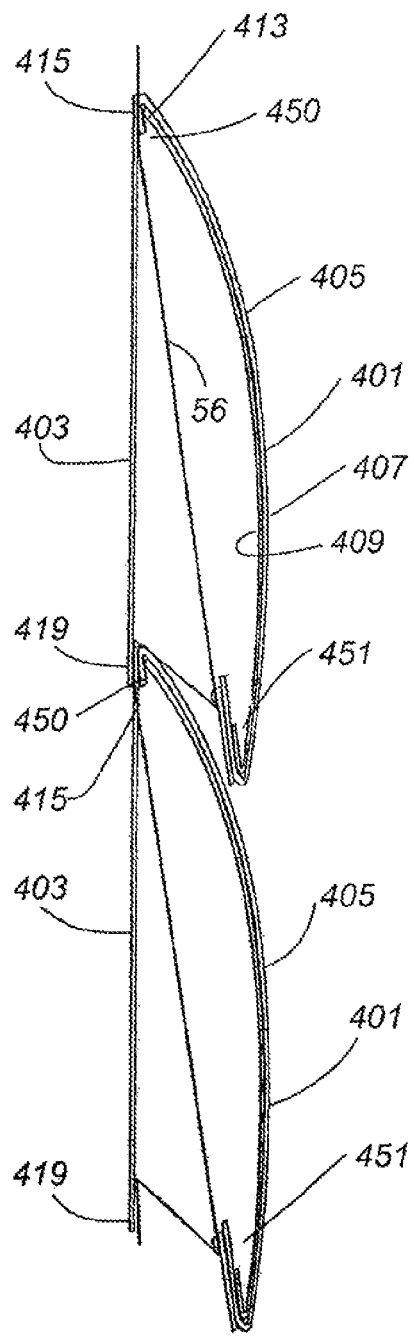
FIG. 37 is a side view of the operable vane structure after converting the base structure of FIG. 33 to the operable vane structure, with the operating element extending along the backing sheet and engaging the bottom of each of the front strips.
Figure 38:
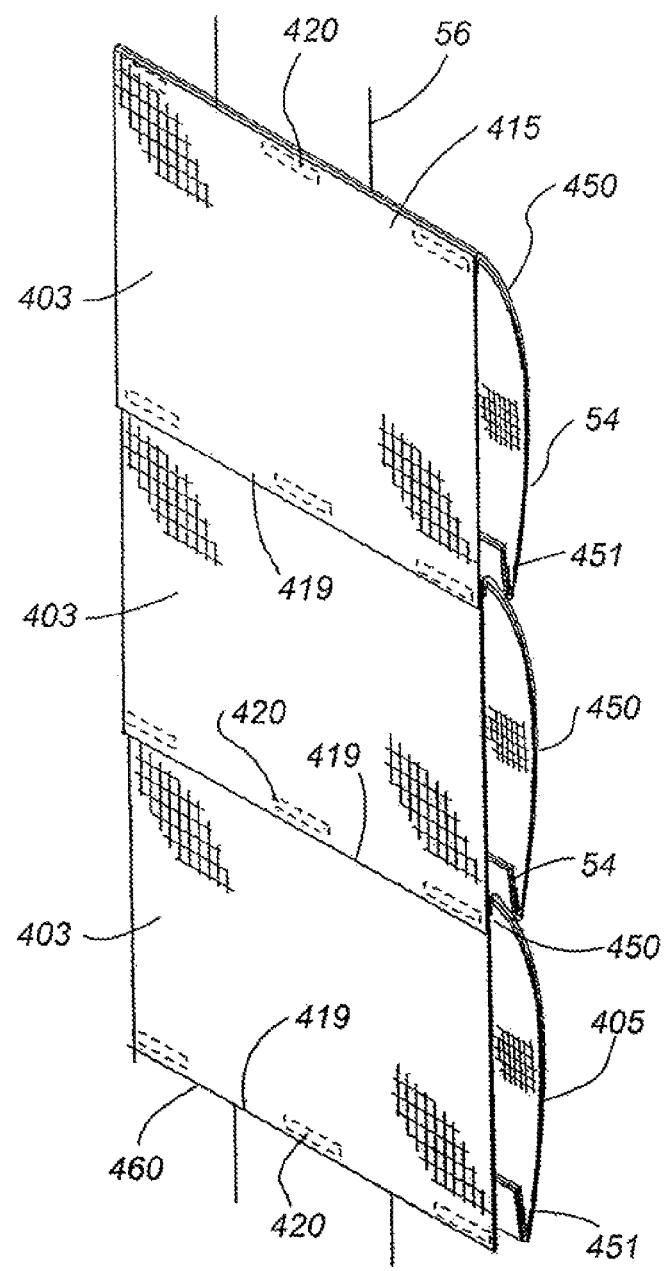
FIG. 38 is a rear perspective view of the completed vane structure shown in FIG. 37.
Figures 39, 40, 41:
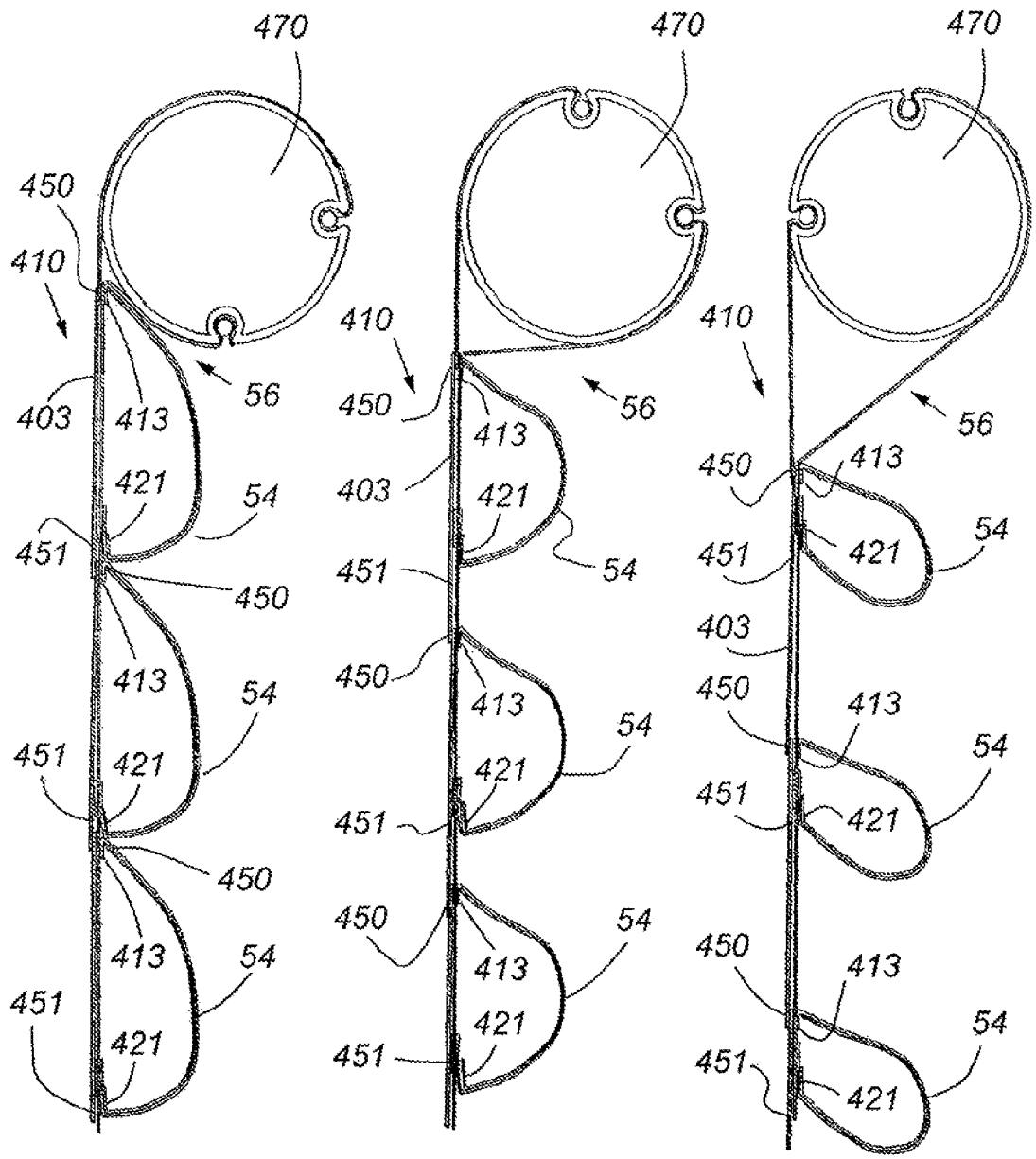
FIG. 39, FIG. 40, and FIG. 41 are side views of the operable vane structure of the converted base structure shown in FIG. 37 in the closed, partially open, and open positions.

FIGS. 33 through 38 disclose another embodiment of a base structure 400 being converted into an operable vane structure 410 (as shown in FIGS. 39-41) similar to those described above. In this embodiment, each operable vane structure 410 is initially comprised of individual component vanes 401 being assembled together and configured to have operable vanes for operation under the control of the operating elements 56. FIG. 33 shows each of the separate vane assemblies 401 in the base structure 400 configuration and prior to being assembled together and converted into an operable vane assembly 410. Each separate assembly 401 includes a back sheet 403 and a front sheet 405. The front sheet 405 in this embodiment has two layers 407, 409 but is not required to have two layers. The back sheet 403 is a single layer in this example. The front sheet 405 has a folded over top edge where a downwardly extending tab 413 engages and is attached to the top front edge 415 of the back sheet 403. The bottom of the front sheet 405 has an upwardly extending rearward tab 421 which is attached to the front side of the bottom edge 419 of the back sheet 403. Each of these folded over tabs 421, 413 form a crease 411, 427, one at the top and one at the bottom. The second layer 409 in this embodiment of the front sheet extends from the top crease 411 down to the bottom crease 427 and part of the way up the back tab 421 at the bottom of the front sheet 405. This second layer 409 can provide control of opacity, and also may provide some stiffness to the structure of the front sheet 405 if desired.

FIG. 34 shows a perspective view of the structures 401 as shown in FIG. 33. A step of converting this base structure 400 into an operable vane structure 410 is to cut the assembly in a manner to separate the front sheet 405 from the back sheet 403 somewhere near the bottom of each separate assembly. In this example, this is done by slicing the back sheet 403 just above the attachment line of the back tab 421 of the front sheet with the back sheet 403, as indicated on FIG. 34 by dashed line 422 and shown having been sliced in FIG. 35. Alternatively, if the back tab 421 of the front sheet 405 is not attached to the back sheet 403, then this slicing action is not required, and the next steps may be performed largely unaltered.

Figure 36:
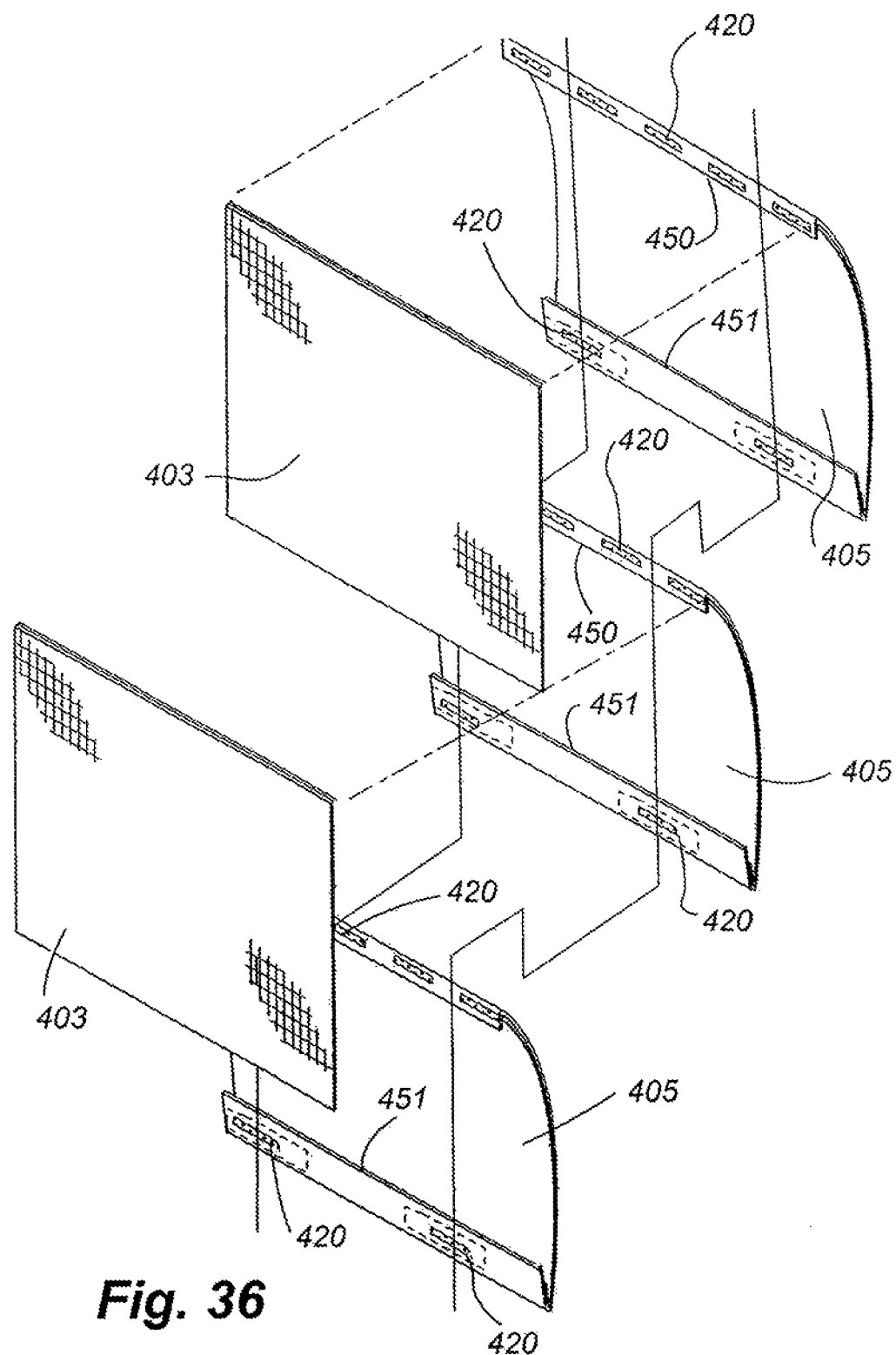
FIG. 36 is an exploded view of the components of the operable vane structure during conversion from the base structure of FIG. 33.

The structure of the separate vane sections 401 having been assembled into an operable vane assembly 410 is shown in an exploded view in FIG. 36. The strips of the separate back sheets 403 are attached top edge 415 to bottom edge 419 to the adjacent back sheets 403. The top edge 450 of the front sheet 405, specifically the folded over top tab 413 is attached with adhesive strips 420 or strip to the top 415 of each back sheet strip 403. It is important to note in this particular embodiment that the operating elements 56 pass between sections of this adhesive 420 in order to allow relative motion of the operating element 56 from the top edge 450 of the front sheet 405 and the back sheet 403. The bottom edge 451 of the front sheet 405 is attached to the operating element 56 in a discreet position by an adhesive 420 (such as described above) in a manner such that the bottom edge 451, while being attached to the operating element 56, may still move relative to the back sheet 403 when actuated by the operating element 56. Thus the adhesive 420 used to attach the operating element 56 to the bottom edge 451 of the front strip 405 should not also attach the bottom edge 451 of the front strip 405 to the back sheet strip 403. A suitable type of adhesive may include a one sided sticky tape, or an adhesive that is then covered by a non-adhesive material to form a barrier and allow relative motion of the bottom edge of the front strip to the back sheet. In this configuration the operating element 56 passes through the engagement of the top edge 450 of the front strip 405 with the back sheet 403 and is allowed to move relative thereto, while the operating element 56 is attached to the bottom edge 451 of the front sheet 405, thus causing the motion of the bottom edge 451 of the front sheet 405 to be controlled by the movement of the operating element 56 up and down, as desired by the user.

FIG. 37 shows the assembled separate vane assemblies having been converted from the base structure 400 to an operable vane structure 410. In this particular arrangement shown in FIG. 37, the bottom edge 451 of the front strip 405 overlaps the top edge 450 of the adjacent lower front strip 407, which helps eliminate the passage of light through any gap that might be formed between adjacent upper and lower operable vanes 54. Given the overlapping structure of the adjacent front strips 405, the operating elements 56 extending from top to bottom of the shade may follow a nonlinear path, such as a zigzag path, through the shade structure in order to pass through the shade structure. As shown in FIG. 37, the operating element 56 extends from the top edge 450 of the front strip on the top assembly down to the bottom flange of the vane 54 of the top assembly 401, then extends upwardly and rearwardly over the top edge 450 of the second assembly and back down to the bottom edge 451 of the vane 54 of the second assembly 401, back up and over the top edge 450 of the third assembly 401 and down to the bottom edge 451 of the third assembly 401 and thereon until the bottom 460 of the shade structure 410. Alternatively, the operating element 56 may pass directly through the adjacent lower operable vane structure 401 without zigzagging.

While the path of the operating element described above is in a zig-zag pattern, it may be relatively less indirect where the bottom tab is longer and positions the attachment location between the bottom tab and the operating element above the top edge of the lower vane.

FIG. 38 shows a rear perspective view of the base structure converted into an operable vane structure 410 when assembled. Each of the steps noted herein with respect to this embodiment may be done manually, or automatically by machine, or a combination of both.

Figure 42:
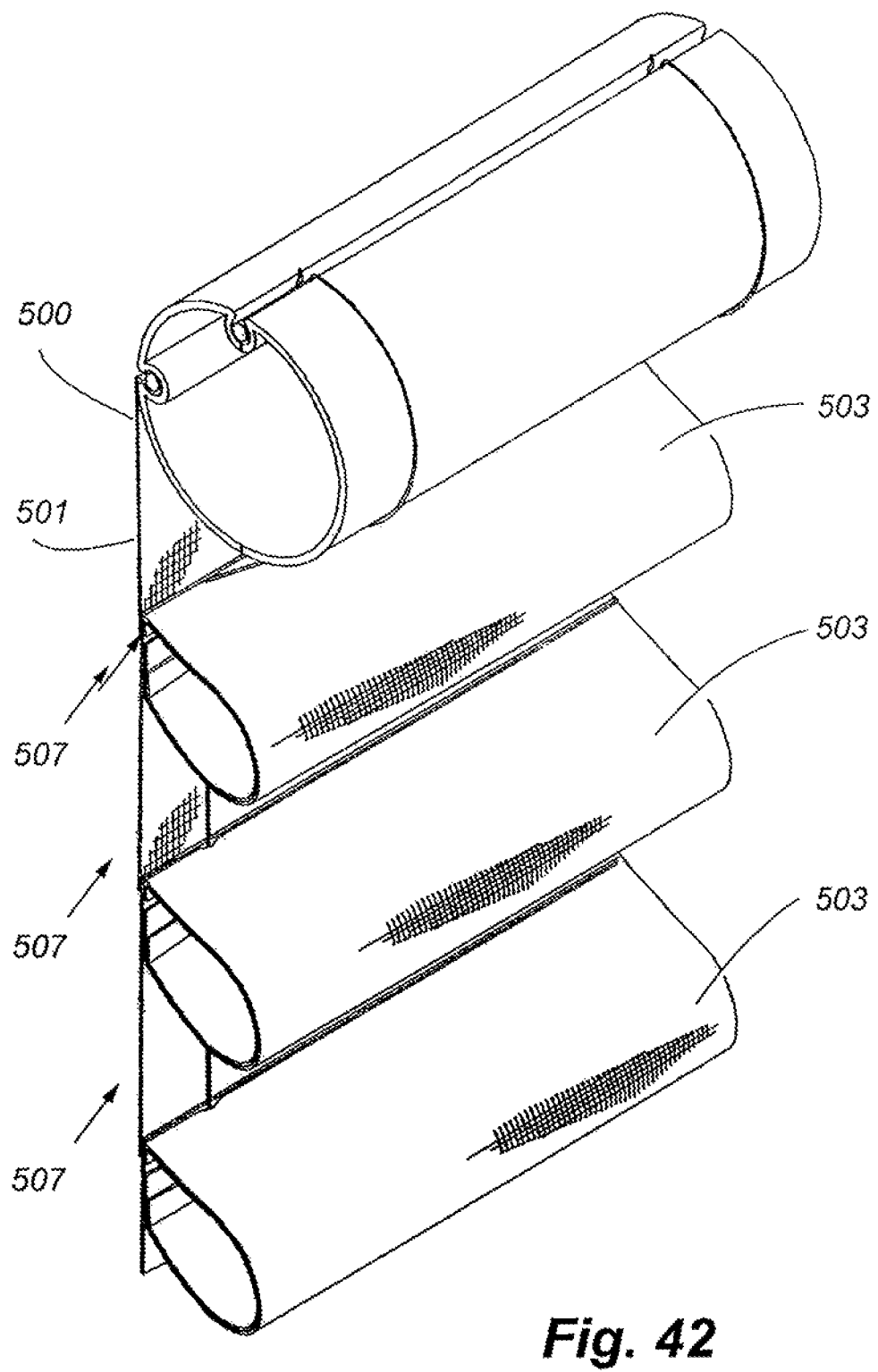
FIG. 42 is a perspective view of the vane structure of FIG. 37 in the fully open position.
Figures 46, 47:
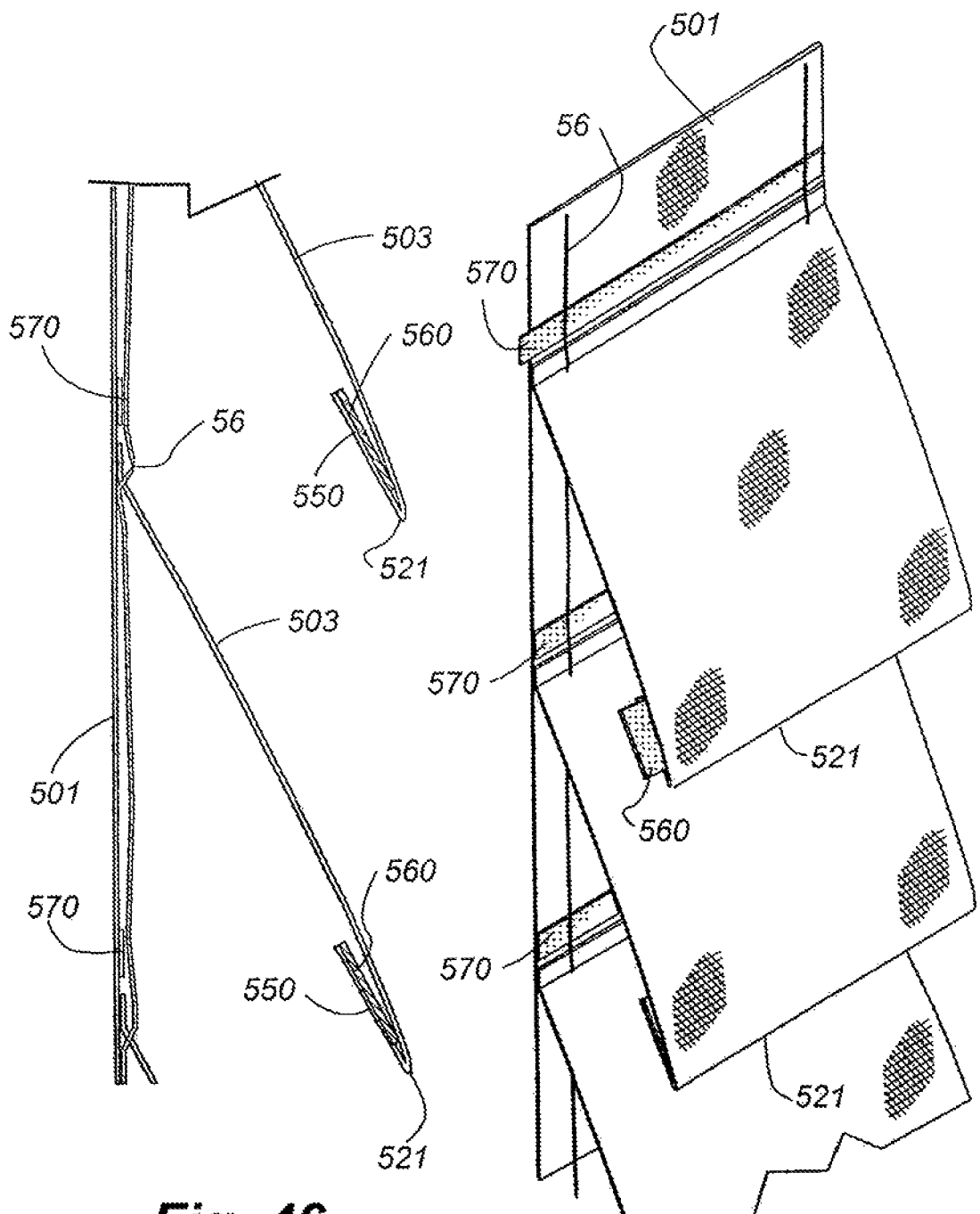
FIG. 46 shows the base structure of FIG. 43 in a side view after alignment and orientation of the operating element along the back sheet and through the front strips.
FIG. 47 shows a front perspective view of the base structure of FIG. 46, and in particular the extension of the operating element through the top portion of each front strip, as well as the positioning of the stiffener in each of the front strips.
Figures 48, 49:
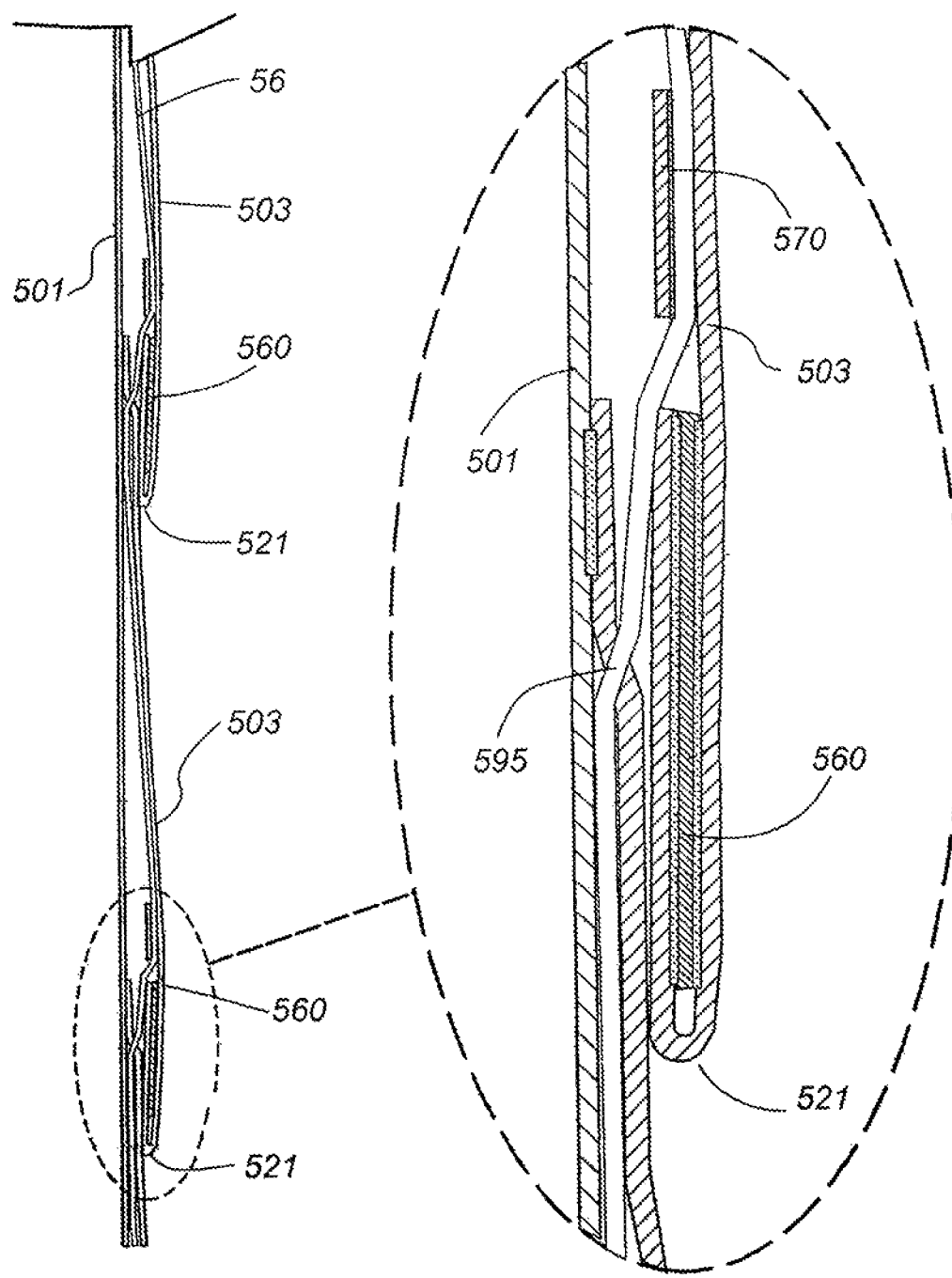
FIG. 48 is a side view of the completed conversion of the base structure shown in FIG. 43 to an operable vane structure.
FIG. 49 is an enlarged view of the completed operable vane structure of claim FIG. 48, to illustrate the layering structure of the completed operable vane structure.
Figure 50:
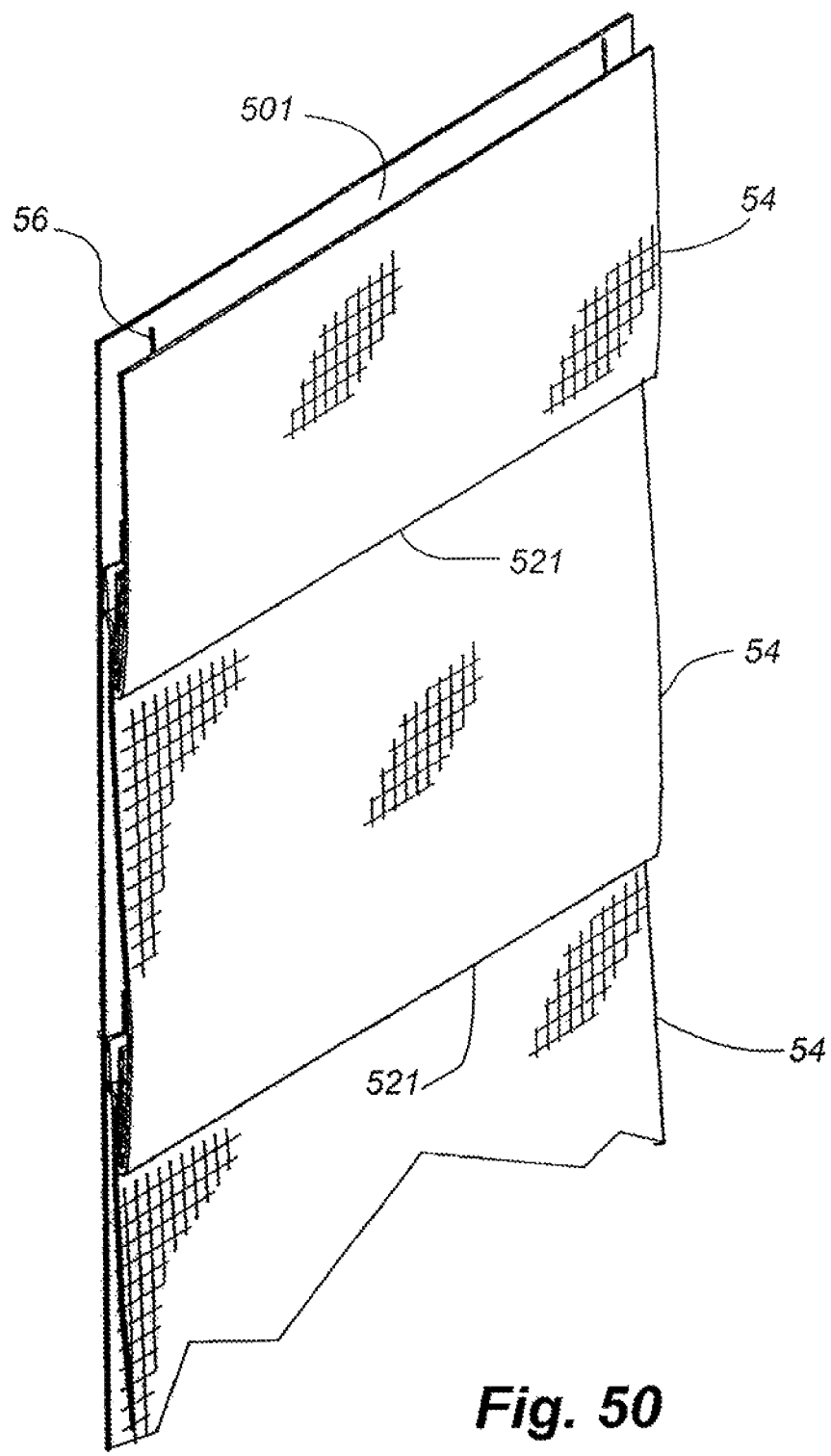
FIG. 50 is a front perspective view of the completed operable vane structure of FIG. 48.

FIGS. 39 through 42 show the various positions of the converted base structure 410 of this embodiment, with FIG. 39 showing the closed position, FIG. 40 showing the partially open position, and FIG. 41 showing the fully open position. FIG. 42 shows a perspective view of FIG. 41, with the operable vane 54 in the open position. The control of the operating elements 56 relative to the back sheet 403 is by the top two roller structure 470, as described by perspective FIGS. 2 and 3, as well as with other embodiments as described above. In the open position, shown in FIG. 42, the operable vane structures 54 protrude more directly away from the back sheet because of the structural integrity provided by the second layer 409 of the front strip 405 as well as the creases formed at the top 450 and bottom 451 by the formation of the top tab 413 and the bottom tab 421. By removing the second layer of the front strip the shape of the operable vane in the open position can be changed as desired.

FIGS. 42 through 54 show another example of a base structure 500 that may be converted into an operable vane shade structure 510 by manual or automatic means. As shown in FIG. 43, the base structure 500 includes a back sheet 501 that is continuous and a front sheet 503 that is divided into sections by overlapping folds 507, dividing the base structure 500 into horizontal sections delineated by overlapping folds 507. For instance, as shown in FIG. 43 as the front sheet 503 extends downwardly at a particular horizontal line, the front sheet 503 is folded to form a bottom edge 511 and is folded into a zigzag shape to form a bottom edge 521 of a first section 509 and the top edge 523 of the next adjacent section 509. The top edge 523 of the next adjacent section 509 is behind the immediately adjacent upper section 509 from which the front sheet 503 extends downwardly again for the next determined length before being folded into a zigzag shape again to replicate the upper fold 507, and on to the bottom of the front sheet 503. In this segmented front sheet 503, the top edge of each zigzag fold is attached to the back sheet along the horizontal line adjacent the top edge 523 of each zigzag fold 507. This attachment can be done by means of a continuous adhesive strip 570, sewing, staples, or any other suitable type of attachment mechanism or means.

From this structure shown in FIG. 43 having the zigzag folds 507, the structure 44 can be created by slicing the front sheet adjacent the top zigzag fold 523, such as along the dashed line 523 shown in FIG. 44, to form separated front strips 503 discreetly vertically separated from one another as shown in FIGS. 44 and 45. In FIG. 45, the front strips 503 are shown extending outwardly to show the delineation between the adjacent front strips 503, and to show the rearwardly folded tab 550 at the bottom of each front strip 503, as well as the top portion of each front strip 503 which is attached along the line of attachment 552 to the back sheet 501. The operating elements 56 are then applied to this structure to extend down the top sheet 503 and through the top portion of each front strip 503 below the line of attachment 552 of each front strip 503, shown in FIGS. 46 and 47. The bottom tab 550 of each front strip is attached to the operating element 56 in a discreet location by an adhesive 570 positioned to attach the operating elements 56 to the back of the bottom tab 550. The adhesive 570 could be an adhesive strip with a one sided adhesive surface in order to attach the operating elements to the back side of the bottom tab 550, yet not attach the operating elements 56 to the back sheet 501, thus allowing the operating elements 56 to move relative to the back sheet 501 while remaining in engagement with the bottom edge 550 of the front strip 503. This adhesive 570, as described to other embodiments, may take many forms.

A stiffener member 560 may be provided in the crease (formed by bottom edge 521) formed between the front bottom tab 550 and the front strip 503 in order to provide structural integrity to the bottom tab 550 and the strip 503. The stiffener 560 may be attached to the bottom tab 550 between the bottom tab 550 and the front sheet 503 by any suitable adhesive means, or by sewing or stapling, or the like. The stiffener 560 may also be attached to the outside of the bottom tab 550 as opposed to between the bottom tab 550 and the front strip 503 if desired. The stiffener 560 may have the same width or less than the bottom tab preferably, as well as may be continuous or segmented along its length. The stiffener 560 may have a height larger than the height of the bottom tab 550 if desired to provide additional rigidity to the bottom tab 550 if necessary. The operating elements 56 pass through the top of each front strip 503 by passing through apertures formed therein either manually or automatically, which allow the operating elements 56 to move relative to the backing sheet 501 in order to operate the operable vane 54 of the adjacent lower operable vane 54 to provide for reduction of light passing through and a gap formed between adjacent vanes 54.

Figures 51, 52, 53:
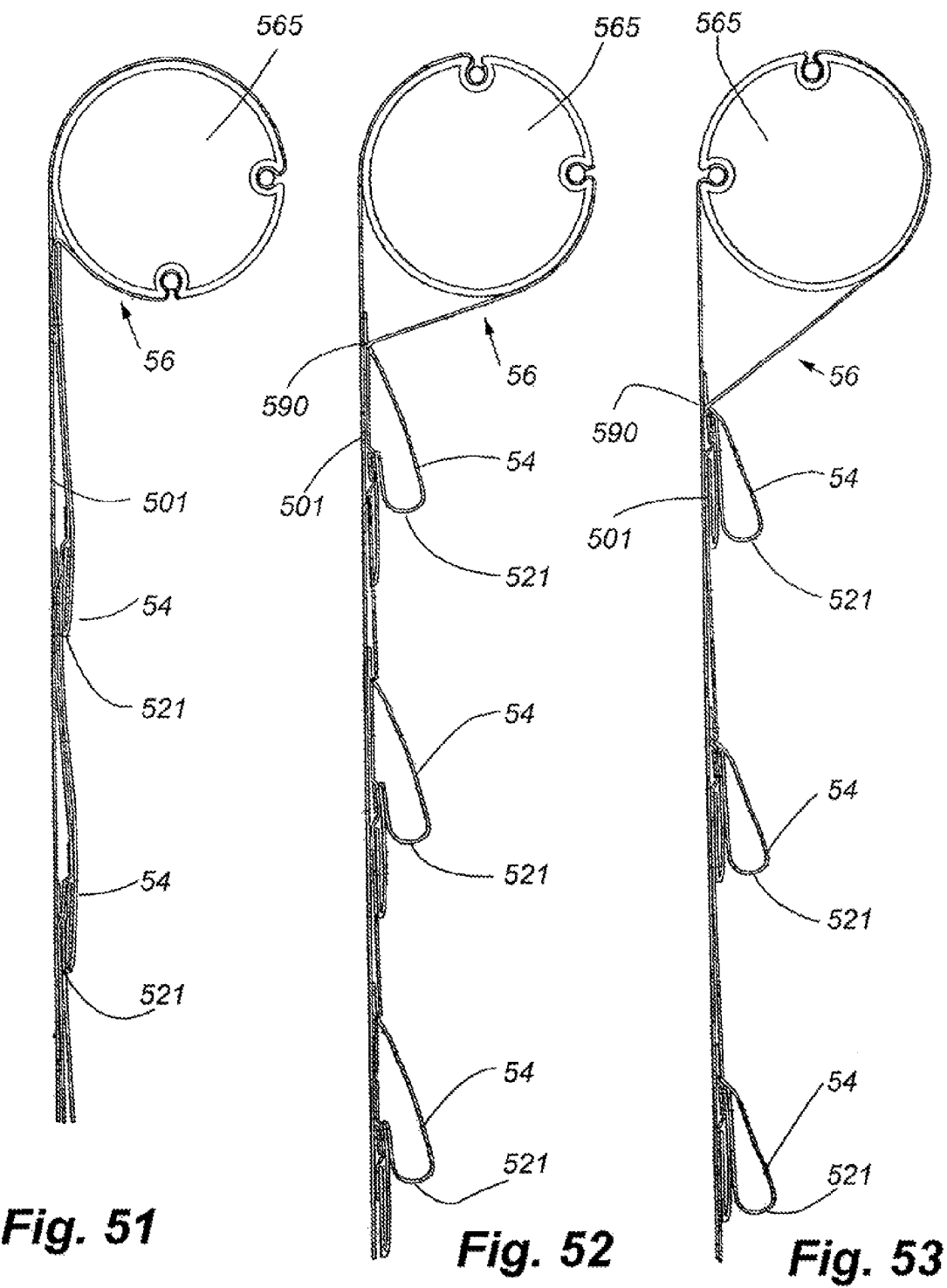
FIGS. 51, 52 and 53 are side views of the completed vane structure of FIG. 48, in the fully closed, partially open, and fully open configurations respectively.

FIGS. 50 through 53 show the base structure of this embodiment as converted into an operable vane structure 510, and between its closed position for 50 or 51 to its open position at 53. FIG. 51 shows the roller control mechanism 565 as disclosed above with respect to FIGS. 2 and 3 and as with other embodiments, with the operating elements 56 in the position to allow the operable vanes 54 to be in their closed and fully extended position. FIG. 52 shows the roller control tube 565 rotated sufficiently to partially retract and partially open the operable vanes 54 by upward movement of the operating elements 56. FIG. 53 shows the uppermost position of each operable vane 54 as controlled by the operating elements 56, where the attachment point 590 of the operating element 56 of the operable vane 54 is adjacent the aperture 595 in the top of the operable vane 54 through which the operating element 56 extends.

Figure 54:
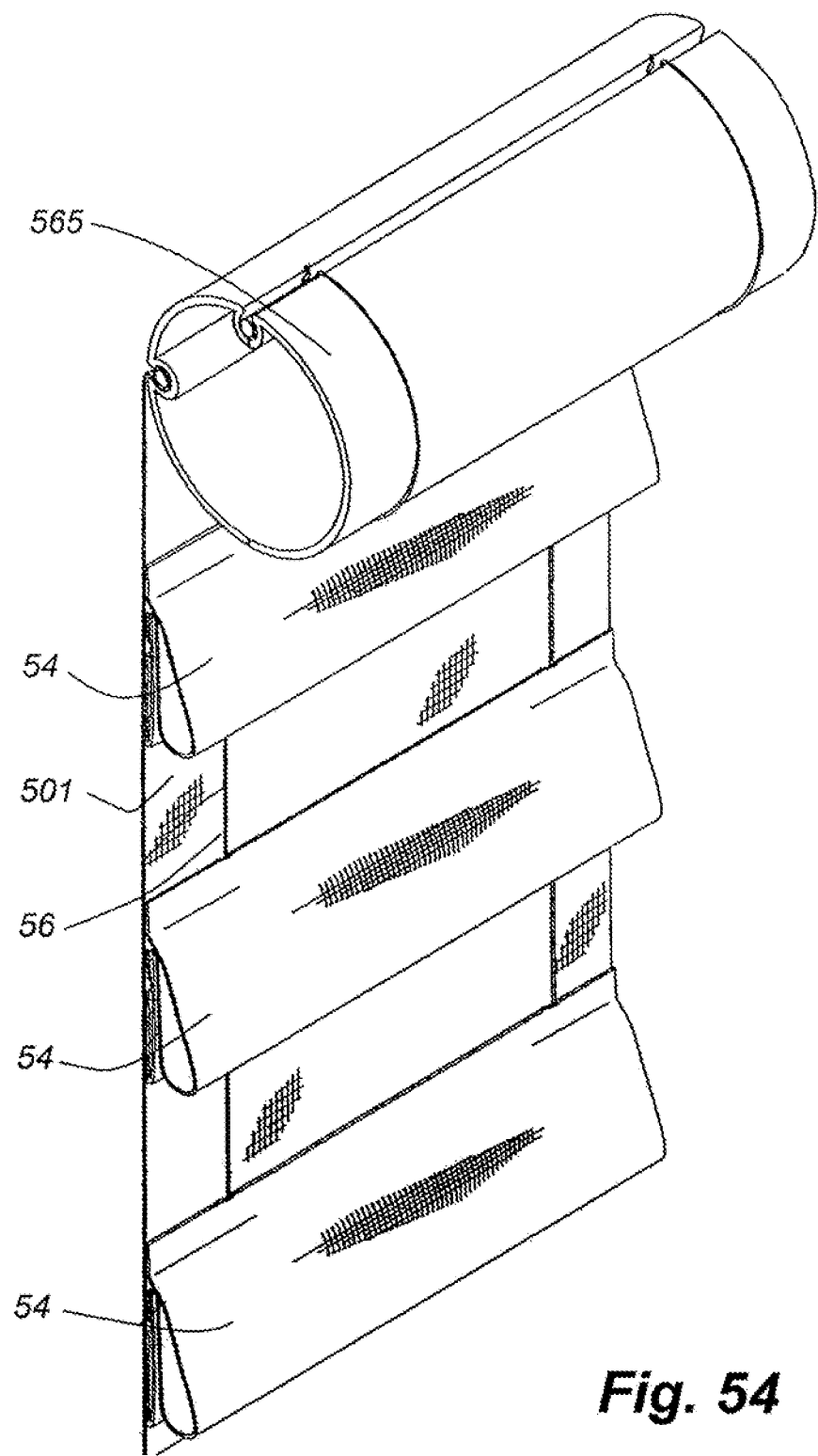
FIG. 54 is a front perspective view of the completed vane structure shown in FIG. 53.

The stiffener 560 in the operable vane 54 positioned between the bottom tab 550 from a portion of the operable vane 54 keeps the bottom section of the operable vane 550 relatively stiff, which restricts that portion of the operable vane from looping away from the back sheet. However, the portion of the operable vane 54 above the stiffened bottom tab 550 does loop forward, which creates a folded over multilayer structure when the operable vane 54 is in its partially open and open positions, such as shown in FIG. 54. This multiple layer structure provides blockage to much of the light if not all the light coming through the shade and thus would create a more heightened horizontal striping effect for the blind when the operable vanes 54 are in their open position.

It is contemplated that the invention disclosed and described herein may be used with other types of shade members than a collapsible shade member. For instance, the invention may be implemented with a roller-type shade where the shade member retracts by rolling up into a wind-up roller positioned in the head rail, as well as other types of shade structures where the shade member is moved between extracted and extended positions. The instant invention may also be used with shade structures where the shade retracts and extends vertically, or retracts and extends horizontally (such as vertical blinds). The shade structure may include slats or vanes made out of rigid or flexible materials and rolled or collapsed between an extended and retracted position. Further, it is contemplated that the front sheet may be sewn or otherwise applied to the back sheet to form a base structure. Also, the front strips may be individually applied to a back sheet without having to be formed or created from a continuous front sheet.

While the methods disclosed herein have been described and shown with reference to particular steps performed in a particular order, it will be understood that these steps may be combined, subdivided, or re-ordered to form an equivalent method without departing from the teachings of the present invention. Accordingly, unless specifically indicated herein, the order and grouping of the steps are not generally intended to be a limitation of the present invention.

A variety of embodiments and variations of structures and methods are disclosed herein. Where appropriate, common reference numbers were used for common structural and method features. However, unique reference numbers were sometimes used for similar or the same structural or method elements for descriptive purposes. As such, the use of common or different reference numbers for similar or the same structural or method elements is not intended to imply a similarity or difference beyond that described herein.

The references herein to "up" or "top", "bottom" or "down", "lateral" or "side", and "horizontal" and "vertical", as well as any other relative position descriptor are given by way of example for the particular embodiment described and not as a requirement or limitation of the shade or the apparatus and method for assembling the shade. Reference herein to "is", "are", "should", "would", or other words implying a directive or positive requirement are intended to be inclusive of the permissive use, such as "may", "might", "could" unless specifically indicated otherwise.

The apparatus and associated method in accordance with the present invention has been described with reference to particular embodiments thereof. Therefore, the above description is by way of illustration and not by way of limitation. Accordingly, it is intended that all such alterations and variations and modifications of the embodiments are within the scope of the present invention as defined by the appended claims.

The terms "adhesive" and "glue" are used interchangeably and are meant to include any heat or pressure responsive product capable of adhering or patching woven or non-woven natural and artificial fabrics together, and are meant to be interpreted as synonymous with one another unless their individual meaning is clearly intended. Double sided sticky tape is contemplated as being included in the definition of "adhesive" or "glue." The breaks in the adhesive in the top of the vane may allow the operating element to slide there within, and can be formed by double-sided sticky tape having a break in its adhesion qualities at the same location as the operating elements passes through the connection point. Further, adhesive is considered to include mechanical bonding between two objects, such as stapling, zipping, sewing or using Velcro to attach any of the shade elements together. Other mechanical attachment or bonding means may be utilized in a similar manner to attach the vane to the backing or any of the vane elements together. Further, and in addition to the use of adhesives described above to create the bond or attachment of the vane to the back sheet, the vanes to the operating elements, or the operating elements to the adhesive, other means of operable attachment may be implemented. For instance, the attachment means may include but are not limited to sonic or ultrasonic welding (using the appropriate well known materials), ultrasonic sealing, induction melting, infrared curing, or hot melt bonding. Ultrasonic horns may be employed for the ultrasonic bonding options above. The different types of operable attachment means described herein are considered an operable bond or attachment and may replace the use of adhesives as described above. The adhesive used on the top and bottom tabs, if any, may not necessarily be the same adhesive type.

Adhesives may also be replaced by or used in conjunction with bicomponent fibers used in the support sheet, the vane, or the operating elements. For instance, no adhesive would be needed where the operating element could selectively adhere to the bottom tab, not the top tab. This may be done by using an extruded bicomponent film with a high-melt polypropylene as a core, and a low melt polypropylene as a sheath to the core. Similarly, the vane or backing sheet could have bicomponent portions with design metal characteristics to selectively adhere to the operating elements and/or the backing sheet, but not bond to the operating element at the top tab or where required not to do so, or where desired not to do so to allow the operating element to move relative to the vane.

The above embodiments assemble a shade that operates with the vanes in a lateral or horizontal orientation while relying on gravity to pull the operating elements downwardly so that the vanes can move from the contracted (see FIG. 1C) to the extended (see position in FIG. 1A) position. The shade product may be designed and manufactured to operate with the vanes oriented vertically or anywhere between vertically and horizontally. Necessary modifications would be required to replace the role played by gravity in the embodiments described herein. For instance, a spring system may be used to actuate the operate element sufficiently to return the shade from the contracted position to the extended position. The back sheet would need to have a spring system also functioning to keep the support shear extended during use. In an embodiment where the vane orientation was vertical, the shade would retract laterally to one side or the other. Vane actuation would cause the individual vanes to contract laterally to one side or the other, depending on design.

The references herein to "up" or "top", "bottom" or "down", "lateral" or "side", or "horizontal" or "vertical," as well as any other relative position descriptor are given by way of example for the particular embodiment described and not as a requirement or limitation of the shade or the apparatus and method for assembling the shade. For instance, in an embodiment of the shade where the vanes are oriented vertically, the top tab or top portion of the vane may become a side portion and the bottom tab or bottom portion of the vane ma become an opposite side portion. Likewise, in an embodiment of the shade where the vanes are oriented horizontally but upside down relative to the embodiments described herein, the top tab may become the bottom tab, and the bottom tab that moves relative to the support shear may become the top tab.

The apparatus and associated method in accordance with the present invention has been described with reference to particular embodiments thereof. Therefore, the above description is by way of illustration and not by way of limitation. Accordingly, it is intended that all such alterations and variations and modifications of the embodiments are within the scope of the present invention as defined by the appended claims.

The invention claimed is:

1. A method of making a shade for an architectural opening having at least one operable vane, the operable vane moving from an open position to an extended position while the shade is at least partially extended, the method comprising:
providing a base structure having a back sheet and a front sheet, the back sheet and front sheet connected by one or more engagement regions extending periodically along a length of extension of the back and front sheets, and unconnected between the one or more engagement regions;
cutting the front sheet adjacent at least one of the one or more engagement regions to form a strip comprising a first edge joined to the back sheet and a second free edge;
positioning at least one operating element between the back sheet and the strip so that the at least one operating element is movable relative to the back sheet; and
attaching the at least one operating element to the strip to form the at least one operable vane;
wherein the at least one operable vane is configured to move relative to the back sheet upon actuation of the operating element.

2. The method of claim 1, wherein the positioning step further comprises:
inserting the at least one operating element through the back sheet from a front side of the base structure.

3. The method of claim 2, wherein the at least one operating element is inserted through the back sheet from the front side of the base structure at a position located above the at least one of the one or more engagement regions.

4. The method of claim 3, wherein the positioning step further comprises:
inserting the at least one operating element through the back sheet from a back side of the base structure.

5. The method of claim 4, wherein the at least one operating element is inserted through the back sheet from the back side of the base structure at a position located below the at least one of the one or more engagement regions.

6. The method of claim 1, further comprising:
inserting a piece of adhesive tape between the at least one operating element and the back sheet.

7. The method of claim 6, wherein the adhesive tape includes a first side configured to adhere to the at least one operating element and to the second free edge of the strip.

8. The method of claim 7, wherein the adhesive tape includes a second side opposite the first side configured to allow the adhesive tape to move relative to the back sheet.

9. The method of claim 6, further comprising attaching the at least one operating element to a back side of the second free edge of the strip with the adhesive tape.

10. The method of claim 1, wherein the operating element is a cord.

11. The method of claim 1, wherein the attaching step comprises attaching the at least one operating element to a back side of the second free edge of the strip to form the at least one operable vane.

12. The method of claim 1, wherein the one or more engagement regions are formed by woven intersections of the front sheet and the back sheet.

13. The method of claim 1, wherein the first edge is a top edge.

14. The method of claim 1, wherein the second free edge is a bottom edge.

15. The method of claim 1, further comprising extending the at least one operating element down a front side of the back sheet to above an engagement region of the one or more engagement regions.

16. The method of claim 15, further comprising extending the at least one operating element through the back sheet from the front side of the back sheet to a back side of the back sheet above the engagement region.

17. The method of claim 16, further comprising:
extending the at least one operating element along the back side of the back sheet; and
extending the at least one operating element through the back sheet from the back side of the back sheet to the front side of the back sheet below the engagement region.

18. The method of claim 17, further comprising alternating the at least one operating element from the front side of the back sheet to the back side of the back sheet and back to the front side of the back sheet in order to bypass the one or more engagement regions.

* * * * *

UNITED STATES PATENT AND TRADEMARK OFFICE
CERTIFICATE OF CORRECTION

PATENT NO.         : 9,080,377 B2
APPLICATION NO.    : 13/948692
DATED              : July 14, 2015
INVENTOR(S)        : Ronald Holt et al.

Page 1 of 1

It is certified that error appears in the above-identified patent and that said Letters Patent is hereby corrected as shown below:

In the Claims

1. Claim 1, column 21, line 43, after "the" and before "operable vane" insert --at least one--; and 2. Claim 1, column 21, line 47, after "and" and before "front sheet" insert --the--.

Signed and Sealed this
Twenty-eighth Day of June, 2016

Michelle K. Lee
*Director of the United States Patent and Trademark Office*